US011415757B2

(12) United States Patent
Brown et al.

(10) Patent No.: US 11,415,757 B2
(45) Date of Patent: Aug. 16, 2022

(54) CLEANING NOZZLE AND NOZZLE ASSEMBLY FOR MULTI-FIBER CONNECTORS

(71) Applicant: Corning Optical Communications LLC, Hickory, NC (US)

(72) Inventors: James Michael Brown, Elmira, NY (US); Elias Panides, Horseheads, NY (US); Adam James Ruggles, Corning, NY (US); Jingru Zhang Benner, Enfield, CT (US); Yi Zhang, Painted Post, NY (US)

(73) Assignee: Corning Optical Communications LLC, Charlotte, NC (US)

(*) Notice: Subject to any disclaimer, the term of this patent is extended or adjusted under 35 U.S.C. 154(b) by 793 days.

(21) Appl. No.: 15/915,455

(22) Filed: Mar. 8, 2018

(65) Prior Publication Data

US 2018/0259720 A1    Sep. 13, 2018

Related U.S. Application Data

(60) Provisional application No. 62/469,745, filed on Mar. 10, 2017.

(51) Int. Cl.
*G02B 6/38* (2006.01)
*B08B 3/04* (2006.01)
(Continued)

(52) U.S. Cl.
CPC .............. *G02B 6/3866* (2013.01); *B08B 3/02* (2013.01); *B08B 3/04* (2013.01); *B08B 5/02* (2013.01); *B08B 2240/02* (2013.01)

(58) Field of Classification Search
CPC .. G02B 6/3866; G02B 6/3807; G02B 6/3847; G02B 6/3897; G02B 27/0006;
(Continued)

(56) References Cited

U.S. PATENT DOCUMENTS

| 4,733,428 A * | 3/1988 | Malinge ............... G02B 6/3866 15/345 |
| 4,850,536 A * | 7/1989 | Teranishi ............. G02B 6/3897 398/1 |

(Continued)

FOREIGN PATENT DOCUMENTS

| CN | 203253667 U | 10/2013 |
| GB | 2322292 A | 8/1998 |

OTHER PUBLICATIONS

International Search Report and Written Opinion PCT/US2018/020665 dated May 17, 2018.

*Primary Examiner* — Michael E Barr
*Assistant Examiner* — Thomas Bucci

(57) ABSTRACT

The nozzle includes a nozzle body having a front end with a recess defining a recessed wall. The recess is elongate in a first direction. The recess receives a front-end section of a ferrule of a multi-fiber connector to define gap, wherein the front-end section has an elongate end face. The nozzle has first and second channels that are elongate in the first direction and have respective first and second front-end openings at the recessed wall. The first and second front-end openings are spaced apart in a second direction perpendicular to the first direction. A cleaning fluid flows from the first channel into the gap and then out the second channel, including over the ferrule end faces and end faces of optical fibers supported by the ferrule. A flow-disrupting feature on the recessed wall generates turbulent flow to enhance cleaning.

35 Claims, 22 Drawing Sheets

(51) Int. Cl.
  *B08B 5/02*   (2006.01)
  *B08B 3/02*   (2006.01)
(58) Field of Classification Search
  CPC ......... B08B 2240/02; B08B 3/02; B08B 3/04;
                                                B08B 5/02
  USPC .......... 134/166 R, 6, 166 C, 198, 21, 104.2,
                 134/169 R, 22.1; 385/134, 85, 76, 77,
                            385/78; 15/210.1, 345, 104.04
  See application file for complete search history.

(56) References Cited

U.S. PATENT DOCUMENTS

| | | | | |
|---|---|---|---|---|
| 5,117,528 A * | 6/1992 | Kanayama | ......... | G02B 27/0006 |
| | | | | 15/210.1 |
| 5,220,703 A * | 6/1993 | Kanayama | ............. | B08B 11/00 |
| | | | | 15/210.1 |
| 5,557,696 A * | 9/1996 | Stein | .................... | G02B 6/3801 |
| | | | | 385/60 |
| 5,711,822 A * | 1/1998 | Burgett | ................ | H01R 43/002 |
| | | | | 134/25.4 |
| 5,768,738 A * | 6/1998 | Lee | .......................... | B08B 1/00 |
| | | | | 15/210.1 |
| 5,836,031 A * | 11/1998 | Cox | .................... | G02B 6/3821 |
| | | | | 15/210.1 |
| 5,925,191 A * | 7/1999 | Stein | .................... | G02B 6/3807 |
| | | | | 15/244.4 |
| 6,006,768 A | 12/1999 | Cox | | |
| 6,047,716 A * | 4/2000 | Shimoji | ............... | G02B 6/3897 |
| | | | | 134/201 |
| 6,125,227 A * | 9/2000 | Cox | .................... | G02B 6/3866 |
| | | | | 385/136 |
| 6,209,163 B1 * | 4/2001 | Clairadin | ........... | G02B 6/3807 |
| | | | | 15/210.1 |
| 6,286,179 B1 * | 9/2001 | Byrne | ................ | A61B 1/00128 |
| | | | | 134/169 C |
| 6,374,030 B2 * | 4/2002 | Krow, Jr | .............. | G02B 6/3807 |
| | | | | 385/85 |
| 6,821,025 B2 * | 11/2004 | Gerhard | .................... | B08B 3/02 |
| | | | | 385/85 |
| 6,839,935 B2 * | 1/2005 | Kiani | ........................ | B08B 3/02 |
| | | | | 15/210.1 |
| 6,853,794 B2 * | 2/2005 | Lu | ........................ | G02B 6/3866 |
| | | | | 134/184 |
| 6,854,152 B2 * | 2/2005 | Loder | .................... | G02B 6/3898 |
| | | | | 15/210.1 |
| 6,863,080 B2 * | 3/2005 | Clatanoff | ................ | B08B 3/026 |
| | | | | 15/302 |
| 6,905,251 B2 * | 6/2005 | Fujiwara | ............. | G02B 6/3807 |
| | | | | 15/97.1 |
| 7,089,624 B2 * | 8/2006 | Malevants | ............. | B08B 1/008 |
| | | | | 15/345 |
| 7,147,490 B2 * | 12/2006 | Gerhard | ................. | B08B 11/02 |
| | | | | 439/85 |
| 7,215,864 B1 * | 5/2007 | Qian | .................... | G02B 6/3807 |
| | | | | 385/85 |
| 7,232,262 B2 * | 6/2007 | Lytle | .................... | G02B 6/3825 |
| | | | | 385/85 |
| 7,377,981 B2 * | 5/2008 | Young | .................... | G02B 6/381 |
| | | | | 134/42 |
| 7,503,701 B2 * | 3/2009 | Hiereth | .................. | A61B 18/22 |
| | | | | 385/85 |
| 7,566,176 B2 * | 7/2009 | Lytle | ..................... | G02B 6/3825 |
| | | | | 385/141 |
| 7,711,232 B2 * | 5/2010 | Lewallen | ............. | G02B 6/3882 |
| | | | | 385/134 |
| 8,298,494 B2 * | 10/2012 | Komiya | ................. | A61B 1/125 |
| | | | | 422/292 |
| 8,959,695 B2 * | 2/2015 | Cunningham | ....... | G02B 6/3866 |
| | | | | 15/210.1 |
| 9,891,389 B1 * | 2/2018 | Fredell | ..................... | B08B 3/04 |
| 10,310,191 B2 * | 6/2019 | Lin | ...................... | G02B 6/3866 |
| 2002/0006261 A1 * | 1/2002 | Krow, Jr. | ............. | G02B 6/3807 |
| | | | | 385/134 |
| 2002/0131748 A1 * | 9/2002 | Sato | ......................... | G02B 6/25 |
| | | | | 385/53 |
| 2002/0162582 A1 * | 11/2002 | Chu | .......................... | B08B 3/02 |
| | | | | 134/186 |
| 2002/0166190 A1 * | 11/2002 | Miyake | .................. | B08B 1/003 |
| | | | | 15/210.1 |
| 2003/0039463 A1 * | 2/2003 | Miyake | ................ | G02B 6/3807 |
| | | | | 385/53 |
| 2003/0098045 A1 * | 5/2003 | Loder | .................... | G02B 6/3898 |
| | | | | 15/210.1 |
| 2003/0111094 A1 * | 6/2003 | Clatanoff | ............... | B08B 3/026 |
| | | | | 134/172 |
| 2003/0169991 A1 * | 9/2003 | Malevanets | ............. | G02B 6/25 |
| | | | | 385/53 |
| 2003/0221706 A1 * | 12/2003 | Kiani | ....................... | B08B 1/00 |
| | | | | 134/21 |
| 2004/0005134 A1 * | 1/2004 | Sun | ...................... | G02B 6/3866 |
| | | | | 385/134 |
| 2004/0013370 A1 * | 1/2004 | Gerhard | .................... | B08B 3/02 |
| | | | | 385/85 |
| 2004/0033050 A1 * | 2/2004 | Lytle | .................... | G02B 6/3807 |
| | | | | 385/147 |
| 2005/0013577 A1 * | 1/2005 | Koide | .................. | G02B 6/3807 |
| | | | | 385/134 |
| 2005/0105859 A1 * | 5/2005 | Gerhard | ..................... | B08B 5/02 |
| | | | | 385/85 |
| 2006/0171641 A1 * | 8/2006 | Zhang | ................ | G02B 27/0006 |
| | | | | 65/29.13 |
| 2007/0034227 A1 * | 2/2007 | Hesch | ....................... | B08B 3/12 |
| | | | | 134/1 |
| 2007/0196056 A1 * | 8/2007 | Gerhard | ............... | G02B 6/3866 |
| | | | | 385/85 |
| 2007/0243008 A1 * | 10/2007 | Vogt | ........................ | B08B 11/00 |
| | | | | 401/132 |
| 2008/0028567 A1 * | 2/2008 | Hackert | ..................... | B08B 3/02 |
| | | | | 15/320 |
| 2008/0152284 A1 * | 6/2008 | Lytle | ........................ | B08B 3/02 |
| | | | | 385/85 |
| 2009/0142027 A1 * | 6/2009 | Lewallen | ............. | G02B 6/3807 |
| | | | | 385/134 |
| 2010/0213214 A1 * | 8/2010 | Lewallen | ............. | G02B 6/3807 |
| | | | | 222/173 |
| 2011/0297184 A1 * | 12/2011 | Mahapatra | ........... | G02B 6/3866 |
| | | | | 15/210.1 |
| 2017/0254963 A1 * | 9/2017 | Sparrowhawk | ....... | G02B 6/3866 |
| 2017/0351039 A1 * | 12/2017 | Nakane | ................. | G02B 6/3866 |

* cited by examiner

CLEANING NOZZLE AND NOZZLE ASSEMBLY FOR MULTI-FIBER CONNECTORS

CROSS-REFERENCE TO RELATED APPLICATIONS

This application claims the benefit of priority of U.S. Provisional Application Ser. No. 62/469,745, filed on Mar. 10, 2017, the disclosure of which is fully incorporated herein by reference.

FIELD

The present disclosure relates to optical fiber connectors and in particular to a cleaning nozzle and nozzle assembly and cleaning methods for multi-fiber connectors.

BACKGROUND

Optical fiber connectors are used to optically couple at least two lengths of optical fibers. To this end, an optical fiber connector includes a ferrule that supports an end portion of at least one optical fiber. The end portion of each optical fiber has a polished end face that resides substantially at the front end of the ferrule. When two optical fiber connectors are operably engaged, the end faces of the corresponding optical fibers are in optical communication (e.g., in contact or via a lens) through the fiber end faces.

One type of optical fiber connector used to support and optically connect multiple optical fibers is called a multi-fiber push on/pull off or "MPO" connector. An MPO connector utilizes a generally rectangular ferrule made of molded plastic loaded with glass to reduce the coefficient of thermal expansion. The ferrule supports the end portions of multiple optical fibers in one or more rows. An MPO connector has a flat front surface defined by the ferrule and referred to as the "ferrule end face" or "connector end face." The optical fibers also have end faces, which are referred to herein as "fiber end faces." The fiber end faces terminate at or near the ferrule end face. An MPO connector can be male or female, with the male MPO connector having alignment pins and the female MPO connector having alignment holes.

The fiber end faces of an MPO connector need to be kept clean to ensure optimum optical transmission and to avoid damage to the optical fibers when making a connection. Methods for cleaning the fiber end faces include both dry cleaning and wet cleaning. There are also contact and non-contact cleaning methods. One of the non-contact cleaning methods uses an impingement jet to deliver high speed air mixed with a solvent to clean the front end of the ferrule. The shear force generated from the impingement jet, combined with the optional chemicals in the solvent, removes particles adhered to the front end of the ferrule.

Current industrial standards, commercial cleaning equipment, and commercial assessment microscopes are focused upon the cleaning of the fiber end faces and a limited area thereabout. However, contaminants from other portions of the ferrule end face, including the alignment features, can make their way to the fiber end faces and can represent a source of connector failure.

SUMMARY

An embodiment of the disclosure is a nozzle for cleaning a multi-fiber connector having a ferrule with an elongate end face. The nozzle has a nozzle body having a front end and a back end, the front end having a recess defining a recessed wall, the recess being elongate in a first direction and sized to receive a front-end section of the ferrule that includes the elongate end face. A first channel resides in the nozzle body and is elongate in the first direction. The first channel has a first front-end opening at the recessed wall. A second channel resides in the nozzle body and is elongate in the first direction. The second channel has a second front-end opening at the recessed wall. The first and second front-end openings are spaced apart in a second direction perpendicular to the first direction.

Another embodiment of the disclosure is a nozzle assembly. The nozzle assembly includes a nozzle that comprises: a nozzle body having a central axis, a front end and a back end, the front end having a recess defining a recessed wall, the recess being elongate in a first direction; a first channel residing in the nozzle body and being elongate in the first direction and having a first front-end opening at the recessed wall; a second channel residing in the nozzle body and being elongate in the first direction and having a second front-end opening at the recessed wall, wherein the first and second front-end openings are spaced apart in a second direction perpendicular to the first direction. The nozzle assembly also includes a multi-fiber connector with a ferrule having a front-end section that is elongate and that includes a ferrule end face. The nozzle assembly further includes a plurality of optical fibers each having an end portion supported by the ferrule and a fiber end face that resides at or proximate to the ferrule end face. The front-end section of the ferrule is received in the recess to define a gap between the ferrule end face and the recessed wall, wherein the gap defines a section of a flow path between the first and second front-end openings of the first and second channels.

Another embodiment of the disclosure is a cleaning system that includes the nozzle assembly as described above, and a cleaning fluid delivery system fluidly connected to the first and second channels of the nozzle and adapted to cause a cleaning fluid to flow over the flow path.

Another embodiment of the disclosure is a method of cleaning a multi-fiber connector that includes a ferrule having a ferrule end face. The ferrule has a long dimension in a first direction and a short dimension in a second direction. The ferrule supports along the long dimension respective end portions of multiple optical fibers each having a fiber end face that resides at or proximate to the end face of the ferrule. The method includes: positioning a front-end section of the ferrule that includes the ferrule end face in a recess at a front end of a nozzle, wherein the recess defines a recessed wall and the nozzle includes an inlet channel and an outlet channel with respective spaced apart front-end openings at the recessed wall, and wherein the ferrule is positioned so that the ferrule end face and the recessed wall form a gap that fluidly connects the inlet channel and outlet channel; and flowing a cleaning fluid from the inlet channel, into the gap, and then out of the outlet channel.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and the operation of the various embodiments. The drawings are not necessary to scale and may exaggerate the size of one or more components and/or one or more features for the sake of illustration and ease of explanation.

The disclosure will become more fully understood from the following Detailed Description, taken in conjunction with the accompanying Figures, in which:

FIGS. 6A through 6C are plots of the wall shear stress SS (Pa) versus they position (m) along the ferrule end face, wherein FIG. 6A is for no flow disrupting feature, FIG. 6B is for a flow disrupting feature in the form of a ridge having a height HR=0.13 mm, and FIG. 6C is for the ridge flow disrupting feature having a height HR=0.03 mm;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. Likewise, the terms "lower" and "upper" and like relative terms are used herein for the sake of reference and ease of explanation and are not intended to be limiting as to direction or orientation.

The term "rounded rectangular" is used herein to describe a rectangle that has one or more rounded corners. Thus, a rounded rectangular cross-sectional shape is one that is substantially rectangular, with the rounded corners reducing the area of the otherwise sharp-cornered rectangle by only a small amount, e.g., by no more than 10% or no more than 5% or no more than 2%.

The expression $X \leq \{P, Q\} \leq Y$ as used herein is shorthand notation for indicating that both P and Q satisfy the stated inequality, and is equivalent to writing $X \leq P \leq Y$ and $X \leq Q \leq Y$.

Cleaning System for Multi-Fiber Connectors

Figure 1A:
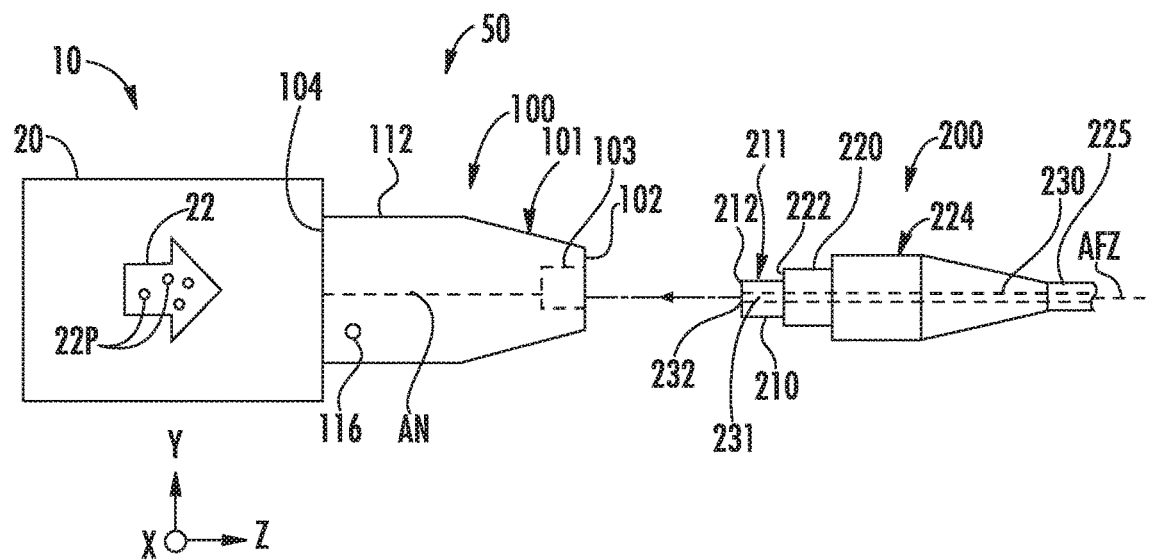
FIGS. 1A and 1B are schematic diagrams of an example cleaning system that employs the nozzle disclosed herein.
Figure 1B:
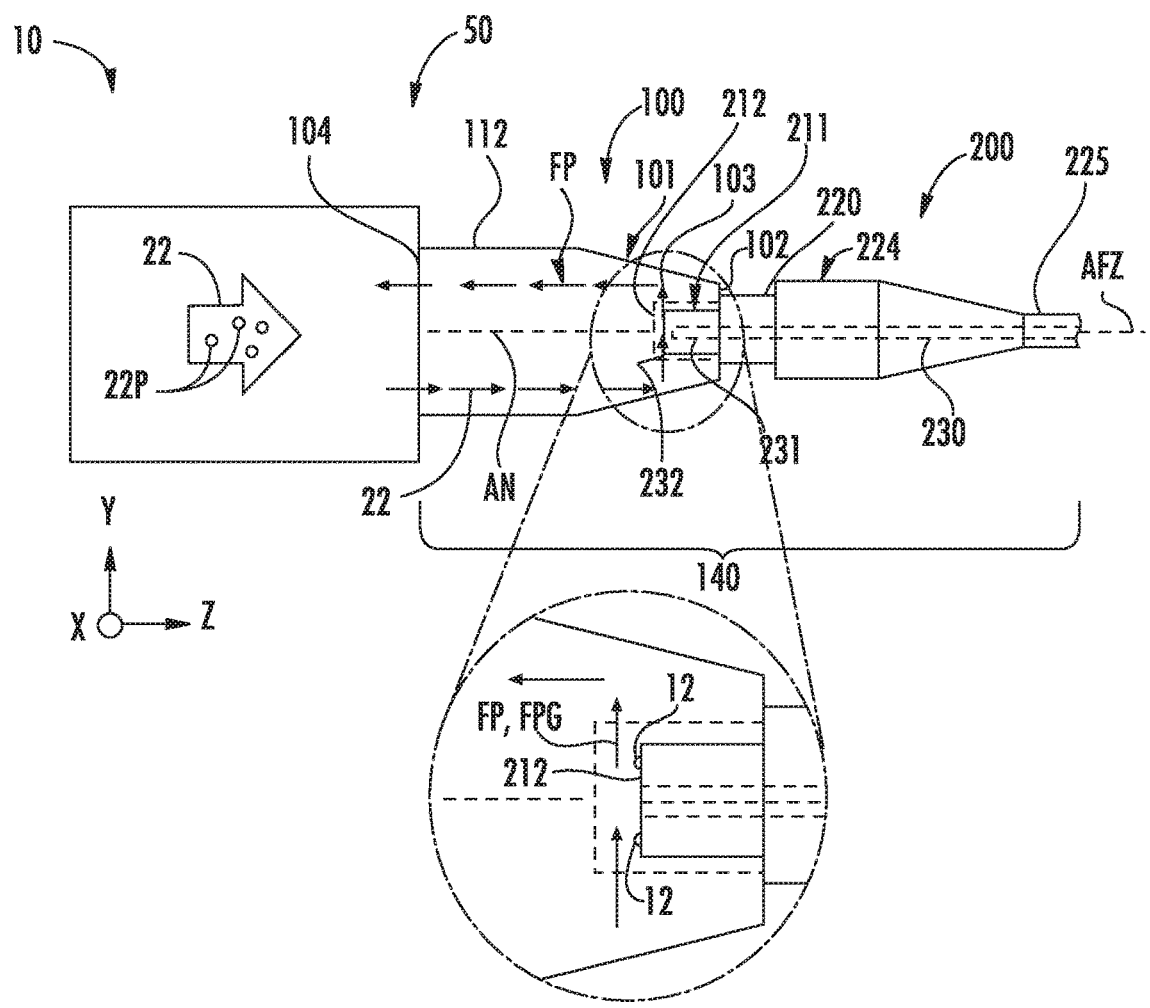
Figure 2A:
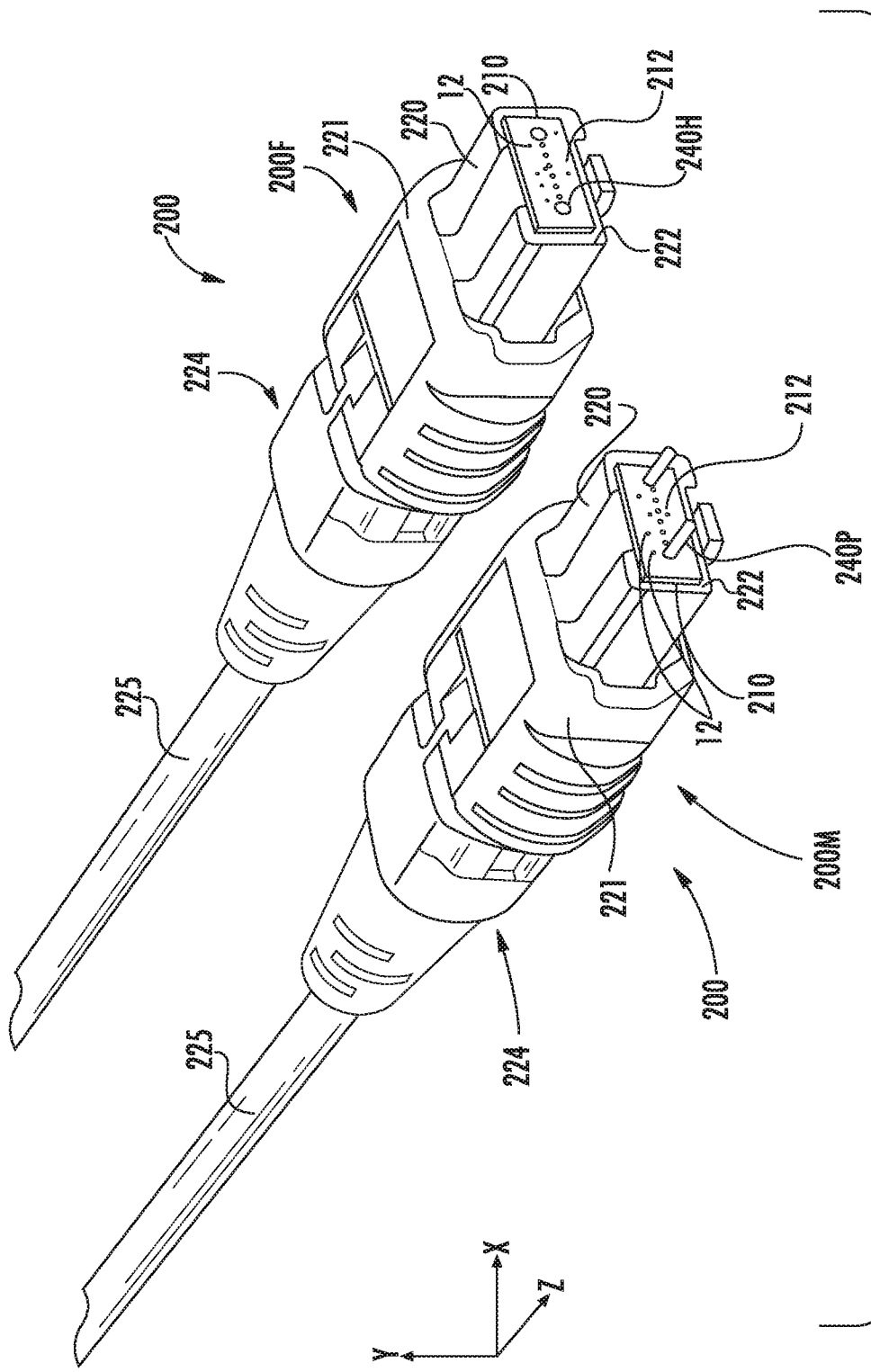
FIG. 2A is a front elevated view of two multi-fiber connectors in the form of MPO connectors, with a male MPO connector on the left and a female MPO connector on the right.
Figure 2B:
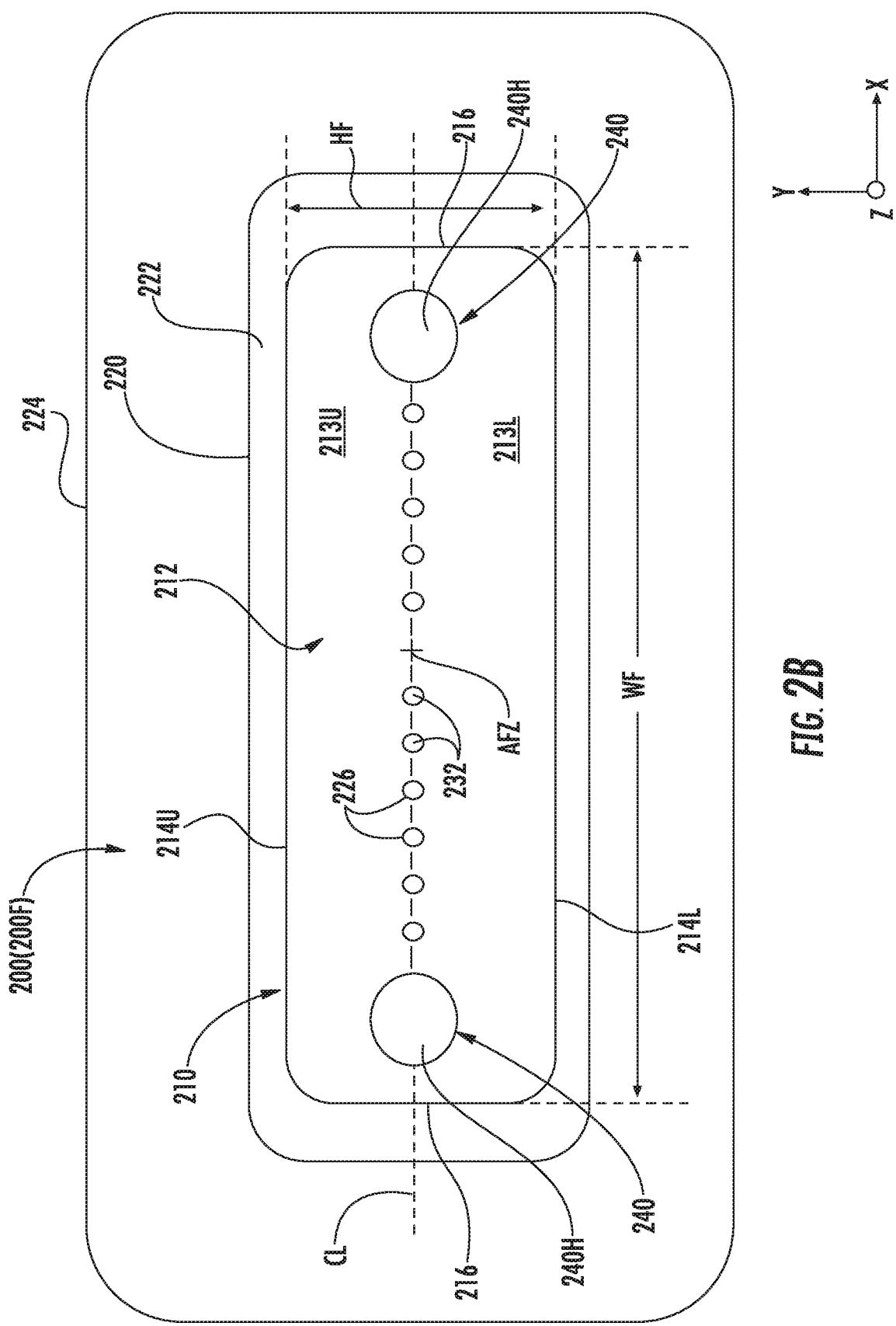
FIG. 2B is a close-up front-on simplified view of an example female multi-fiber connector.

FIG. 1A is a partially exploded schematic diagram and FIG. 1B is a schematic diagram of an example cleaning system 10 for cleaning a multi-fiber connector by removing debris 12 from the multi-fiber connector. The cleaning system 10 includes a cleaning fluid delivery device 20 and a nozzle 100. The cleaning system 10 also includes a multi-fiber connector 200. FIG. 2A is a front elevated view of example male MPO type of multi-fiber connector 200M (left side) and female MPO type of multi-fiber connector 200F (right side). FIG. 2B is close-up front-on simplified view of an example female multi-fiber connector 200F.

The multi-fiber connector 200 includes a ferrule 210. The ferrule 210 extends from a connector housing or holder 220 that has a front end 222. The connector housing 220 is operably supported by a connector body 224 that facilitates attaching the connector 200 to a cable 225. The ferrule 210 has a central axis AFZ that runs in the z-direction. The ferrule 210 has a front-end section 211 that has generally a flat end face 212, referred to herein as the ferrule end face. In an example, the ferrule end face 212 resides in an x-z plane, i.e., is perpendicular to the z-direction and to the ferrule central axis AFZ. In another example, the ferrule end face 212 makes a relative small angle $\theta_R$ (e.g., 6° to 8°) to the x-z plane to reduce back reflections when making optical connections (see FIG. 3E, introduced and discussed below). Debris 12 is shown on the ferrule end face 212.

In an example, a portion of the front-end section 211 of the ferrule 210 protrudes from the connector housing 220 so that the ferrule end face 212 resides beyond the front end 222 of the connector housing. The ferrule end face 212 has a centerline CL that runs in the x-direction and defines a lower half 213L and an upper half 213U of the ferrule end face. The lower half 213L includes a lower edge 214L of the ferrule end face while the upper half 213U includes an upper edge 214U of the ferrule end face.

The ferrule 210 includes bores 226, with each bore supporting a front-end section 231 of an optical fiber 230 from the cable 225. The front-end section 231 of the optical fiber 230 has a fiber end face 232 that resides at or proximate to the ferrule end face 212. In an example, the bores 226 reside along or proximate to the centerline CL. A securing material such as an adhesive or an epoxy (not shown) can be used to secure the optical fibers 230 within the bores 226.

The ferrule end face 212 is elongate in the x-direction ("first direction") and includes along the short dimension (i.e., the y-direction) a lower edge 214L and an upper edge 214U and in the long dimension (x-direction) has opposite sides 216. The male multi-fiber connector 210M includes alignment features 240 in the form of alignment pins 240P while the female multi-fiber connector 200F includes alignment features 240 in the form of complementary alignment holes 240H.

In an example, the ferrule end face 212 has industry standard dimensions (e.g., see International Electrotechnical Commission (IEC) 61754-7-1, edition 1.0, 2014-09), namely a height HF in the y-direction in the range from 2.4 mm to 2.5 mm and width WF in the x-direction in the range from 6.3 mm to 6.5 mm (e.g., HF=2.45 mm and WF=6.4 mm).

With reference again to FIGS. 1A and 1B, the nozzle 100 includes a front-end section 101 with a front end 102. The front end 102 includes a recess 103 (see FIG. 3A, introduced below) configured to receive the front-end section 211 of the ferrule 210 (see FIG. 2B). The recess 103 is elongate in the x-direction like the ferrule end face 212. The nozzle 100 can be fluidly attached to the cleaning fluid delivery device 20 (e.g., at a back end 104 of the nozzle or through an outer surface 112 of the nozzle), which is configured to deliver a cleaning fluid 22 to the nozzle and to cause the pressurized flow of the cleaning fluid through the nozzle over a flow path FP. The cleaning fluid 22 can be a gas, a liquid, or a combination of a gas and a liquid. An example cleaning fluid 22 includes or consists of air and a solvent. In an example, the cleaning fluid 22 can optionally include particles 22P, which can be combined with a gas, a liquid, or a combination of the gas and the liquid. Because such particles 22P are used for cleaning, they are referred to herein as "cleaning particles." Example cleaning particles 22P include for example frozen particles (e.g., ice) used in so-called "snow cleaning" applications. In an example, the liquid portion of the cleaning fluid can be introduced into the nozzle 100 through a side port 116 (see also FIG. 3A) while the gas portion can be introduced at the nozzle back end 104.

Example nozzles 100 are described in greater detail below. The combination of the cleaning fluid delivery device 20 and the nozzle 100 defines a cleaning assembly 50. The combination of the nozzle 100 and the multi-fiber connector 200 operably engaged therewith (i.e., the nozzle and connector arranged so that the ferrule end face 212 is received in the recess 103) defines a nozzle assembly 140. The nozzle 100 includes a longitudinal axis AN that runs in the z-direction and through the center of the nozzle body 110. This axis is referred to hereinbelow as the nozzle central axis AN.

As shown in FIG. 1B, the nozzle 100 defines a portion of the flow path FP for the cleaning fluid 22 from the cleaning fluid delivery device 20 to the recess 103 of the nozzle 100 and then back toward the cleaning fluid delivery device, as described in greater detail below. The cleaning fluid 22 returning through the nozzle 100 toward the cleaning fluid delivery device 20 may be diverted into a containment vessel (not shown) before reaching the cleaning fluid delivery device 20. In an example, the cleaning fluid delivery device 20 sets the inlet pressure $P_{in}$, i.e., the pressure of the cleaning fluid 22 as inputted into the back end 104 of the nozzle 100 (or a side port 116, introduced and discussed below), and also provides a negative outlet pressure (vacuum) $P_{out}$ on return portion of a flow path FP over which the cleaning fluid 22 flows. It is noted that the flow path FP flows only or substantially only in a single direction over the ferrule end face 212 at a given time, as described in greater detail below.

Nozzle

Figure 3A:
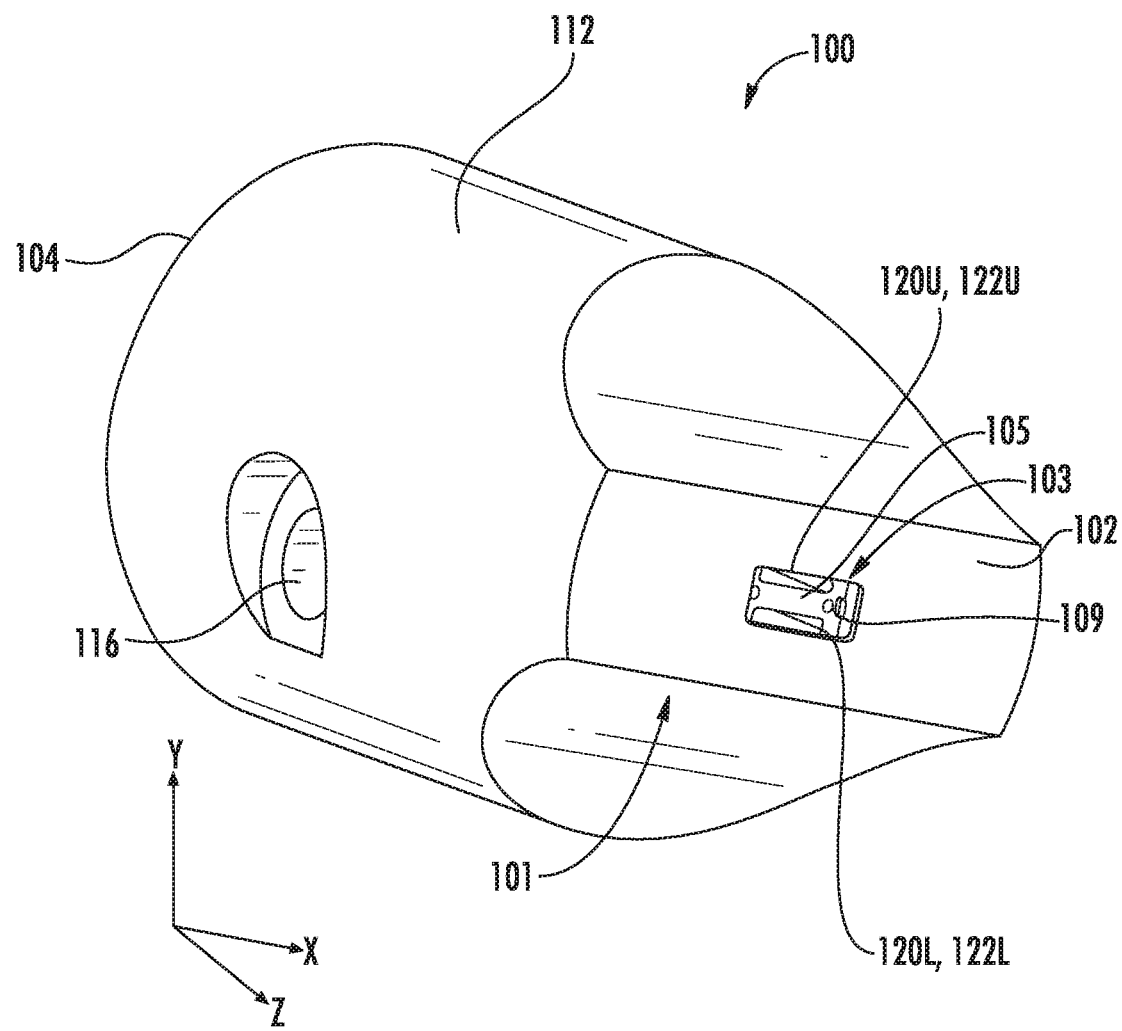
FIG. 3A is a front elevated view of an example nozzle.
Figure 3B:
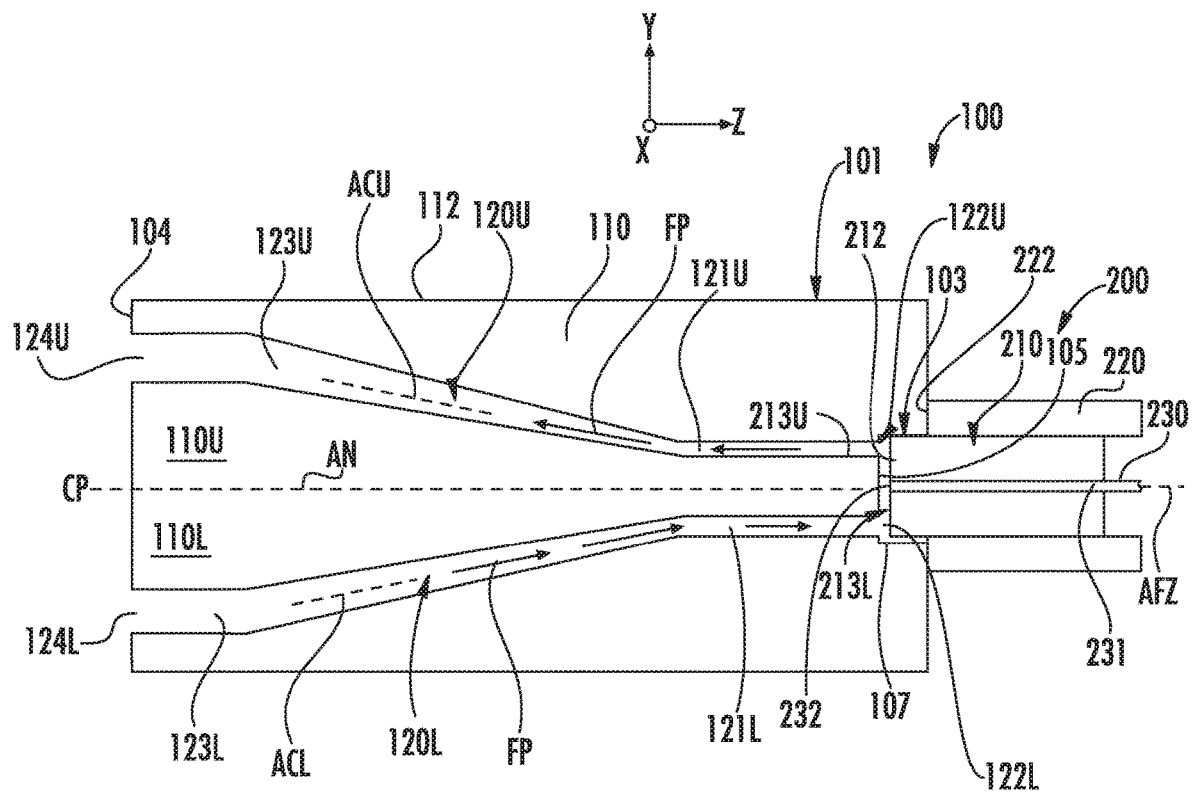
FIG. 3B is a y-z cross-sectional view of the example nozzle of FIG. 3A operably engaged with the front end of a multi-fiber connector to form a nozzle assembly.
Figure 3C:
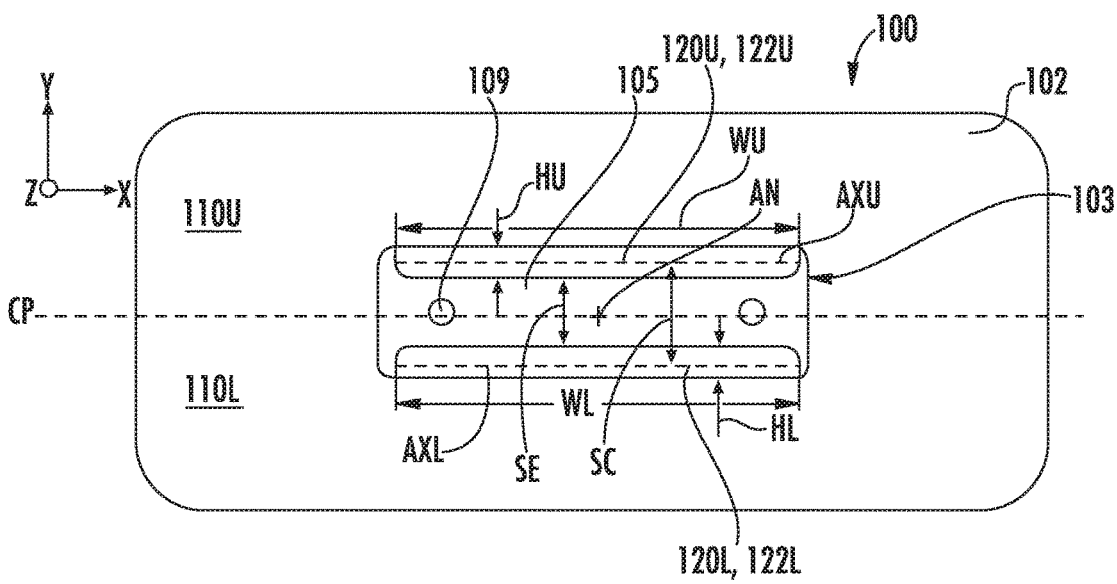
FIG. 3C is a close-up front-on view of the nozzle of FIG. 3A showing the front-end recess that receives the front-end section of the ferrule and showing the front-end openings of the lower and upper channels that run within the nozzle body.
Figure 3D:
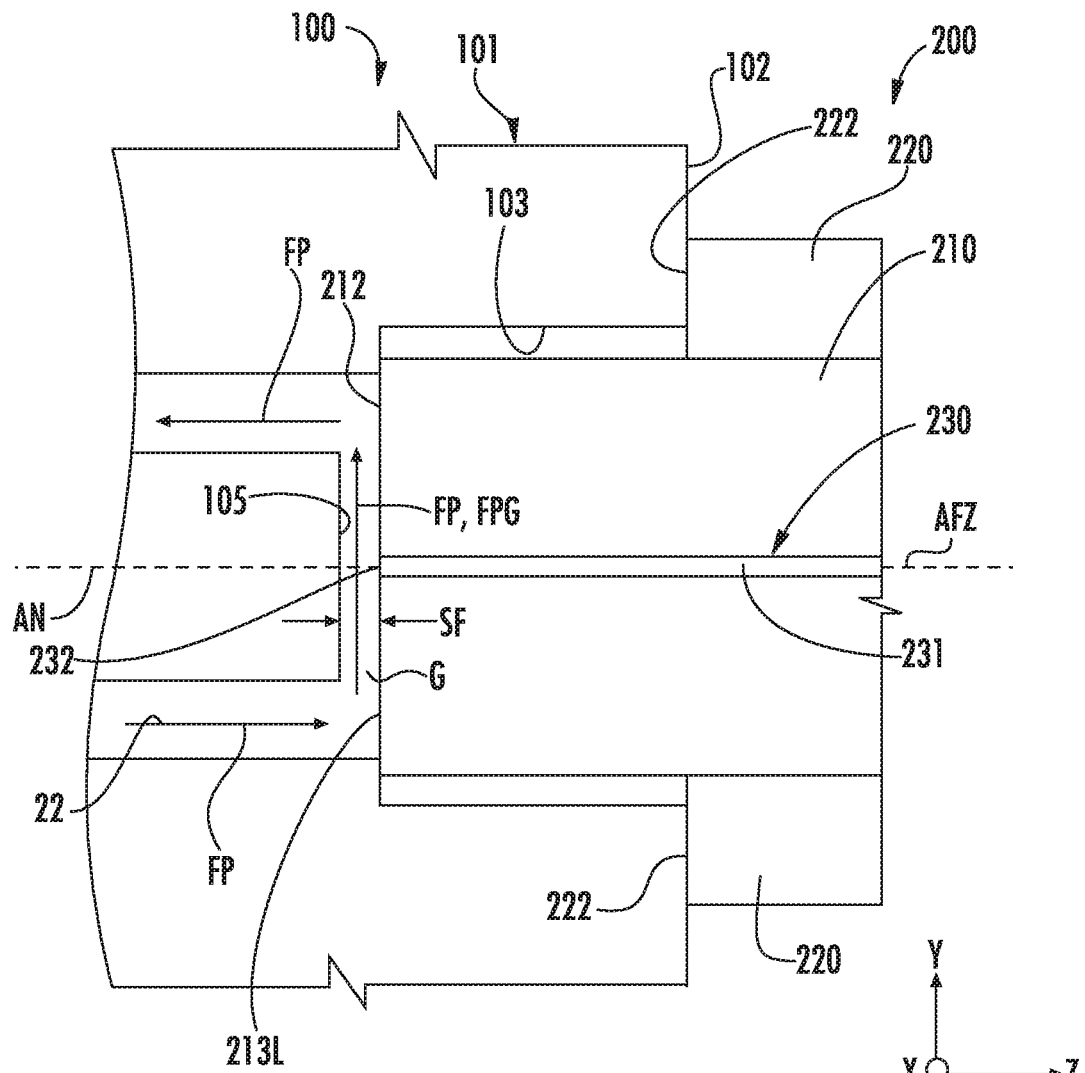
FIG. 3D is a close-up y-z cross-sectional view of the front-end section of the nozzle showing more details of the flow path FP.

FIG. 3A is a front elevated view of an example of the nozzle 100 while FIG. 3B is a y-z cross-sectional view of the nozzle and FIG. 3C is front-on view. FIG. 3D is a close-up y-z cross-sectional view of the front-end section 101 of the nozzle 100. FIG. 3D is similar to FIG. 3E and shows an example angled configuration for the front-end section 101 of the nozzle.

The nozzle 100 includes a body 110. The x-z plane that includes the central axis AN defines a central x-z plane ("center plane") CP (see FIG. 3C) and divides the body 110 into first and second halves, which are referred to herein as lower half 110L and upper half 110U. The body 110 includes an outer surface 112 between the front end 102 and back end 104. The aforementioned recess 103 defines a recessed wall 105 that is set back from the rest of the front end 102. In one example, the recessed wall 105 resides in the x-y plane, i.e., is perpendicular to the z-direction, while in another example, the recessed wall can be angled relative to the x-y plane (see FIG. 3E, introduced and discussed below).

The nozzle 100 includes first and second channels 120, which are referred to herein as lower channel 120L and upper channel 120U. The lower channel 120L resides in the lower half 110L of the body 110 and an upper channel 120U resides in the upper half 110U of the body 110. In an example, the lower and upper channels 120L and 120U have an elongate cross-sectional shape (e.g., elongate in the x-direction). In an example, the elongate cross-sectional shape is generally rectangular, e.g., a rectangle with sharp edges or one or more rounded corners ("rounded rectangular"). The lower channel 120L has a central or longitudinal axis ACL as well as a lateral or cross-sectional axis AXL in the long direction (see FIG. 3C) and which is referred to hereinafter as long axis AXL. Likewise, the upper channel 120U has a central or longitudinal axis ACU as well as a lateral or cross-sectional axis AXU in the long direction and which is referred to hereinafter as long axis AXU.

The lower channel 120L has a front-end section 121L with a first front-end opening 122L at the recessed wall 105 of the recess 103 and has a back-end section 123L with a first back-end opening 124L either at the back end 104 or in the outer surface 112. Likewise, the upper channel 120U has a front-end section 121L with a second front-end opening 122U at the recessed wall 105 of the recess 103 and a back-end section 123U with a second back-end opening 124U either at the back end 104 or in the outer surface 112.

In an example, the recess 103 includes a lip 107 used to define a spacing SF between the recessed wall 105 and the ferrule end face 212 when the multi-fiber connector 200 is operably engaged with the nozzle 100, as shown in FIG. 3B. In an example, the front end 222 of connector housing 220 contacts the front end 102 of the nozzle 100 and defines the spacing SF. The spacing SF defines a gap G through which the cleaning fluid 22 can flow (i.e., defines a gap section FPG of the flow path FP) as described below. The spacing SF is referred to hereinafter as the gap spacing SF, which is also the axial width of the gap G. In an example, the recessed wall 105 includes holes 109 to accommodate the alignment pins 140P of the male multi-fiber connector 100M (see FIG. 2A). In an example, the gap spacing SF is in the range defined by 0.1 mm≤SF≤1 mm or more preferably 0.1 mm≤SF≤0.6 mm or even more preferably 0.1 mm≤SF≤0.3 mm.

Starting from the back end 104 of the nozzle 100, the back-end sections 123L and 123U of the lower and upper channels 120L and 120U converge moving in the +z direction toward the front end 102, with the first and second front-end channel sections 121L and 121U becoming substantially parallel (i.e., parallel or within 5 degrees of parallel) in the nozzle front-end section 101. The first and second front-end openings 122L and 122U are separated in the y-direction in the front-end section 101 by a center-to-center channel spacing SC as measured between the respective long axes AXL and AXU of the front-end openings. In an example, the channel spacing SC is in the range (0.1)HF mm≤SC≤(0.9)HF. In one particular example, 1.75 mm≤SC≤1.95 mm.

The first and second front-end openings 122L and 122U are also separate by an edge-to-edge spacing SE as measured between the two closest edges of the front-end openings. In an example, the edge-to-edge spacing SE is in the range from (0.01)HF≤SE≤(0.8)HF. In one particular example, 1.0 mm≤SE≤1.5 mm.

The channel spacing SC and the edge-to-edge spacing SE are such that the front-end opening 122L of the lower channel 120L either resides opposite the lower half 213L of the ferrule end face 212 or the lower edge 214L of the ferrule end face, or resides below the lower edge of the ferrule end face, while the front-end opening 122U of the upper channel 120U either resides opposite the upper half 213U of the ferrule end face 212 or the upper edge 214U of the ferrule end face, or resides above the upper edge of the ferrule end face.

In an example, the first and second front-end openings 122L and 122U of the lower and upper channels 120L and 120U have respective heights HL and HU in the y-direction in the range (0.1)HF≤{HL, HU}≤(0.5)HF and have respective widths WL and WU in the x-direction in the range (0.5)HF≤{HL, HU}≤(1.1)HF The cross-sectional view of FIG. 3B shows an example of the flow of cleaning fluid 22 over an example flow path FP. The close-up cross-sectional view of FIG. 3D shows more details of the flow path FP, including the gap section FPG of the flow path. The cleaning fluid 22 is shown flowing generally in the +z direction in the lower channel 120L until it reaches the first front-end opening 122L. Thus, in this example, the lower channel 120L serves as an inlet channel and so can also be referred to as inlet channel 120L. The cleaning fluid 22 then enters the gap G and flows in the gap section FPG of the flow path FP and thus over the ferrule end face 212 in the general direction from the lower edge 214L to the upper edge 214U of the ferrule end face. Thus, the cleaning fluid 22 is first incident upon the lower half 213L of the ferrule end face 212 and in an example flows over the lower edge 214L of the ferrule end face. The cleaning fluid 22 then flows upward along the ferrule end face 212 (i.e., in the y-direction or short direction of the ferrule end face), including over the fiber end faces 232 that reside at or proximate to the centerline CL. The cleaning fluid 22 continues to flow in the gap section FPG of the flow path FP upward along the ferrule end face 212 to the upper half 213U of the ferrule end face, and in an example travels all the way to the upper edge 214U of the ferrule end face. The cleaning fluid then enters the second front-end opening 122U of the upper channel 120U, having flowed in substantially only a single direction at a given time i.e., the y-direction, which is the short dimension of the ferrule end face 212.

The upper channel 120U serves to remove the cleaning fluid 22 from the gap G and so is also referred herein to as outlet channel 120U. The gap G serves as a "cleaning channel" that fluidly connects the lower and upper channels 120L and 120U and is where the cleaning of the ferrule end face 212 and the fiber end faces 232 takes place. The direction of the flow of cleaning fluid 22 can also be in the reverse direction, and the flow direction described herein is selected for ease of explanation and illustration and is not limiting. The reversal of the flow direction still results in the cleaning fluid 22 flowing in substantially only one direction (i.e., a single direction) at a given time. This is in contrast to other cleaning techniques where a cleaning fluid is incident upon the center of the ferrule end face and then flows in multiple directions (including opposite directions) rather than in a single direction over the end face. This is because the nozzle 100 disclosed herein includes upper and lower channels 120L and 120U with respective first and second front-end openings 122L and 122U that are spaced apart at the recessed wall 105 and there is no other channel that resides within the nozzle body 110 and that has an opening at the recessed wall 105.

The flow path FP is configured such that within the gap section FPG the cleaning fluid 22 passes over fiber end faces 232 as well as at least a portion of the ferrule end face 212. In an example, the recess 103 and the channel spacing SC are configured so that the cleaning fluid 22 passes over at least 90% or at least 95% of the ferrule end face 212. In an example, the recess 103 and the channel spacing SC are configured so that the cleaning fluid 22 passes over 100% of the ferrule end face 212. The channel spacing SC as well as the channel dimensions HU, HL, WU and WL can be selected based on the dimensions of the multi-fiber connectors 200 to be cleaned.

Figure 3E:
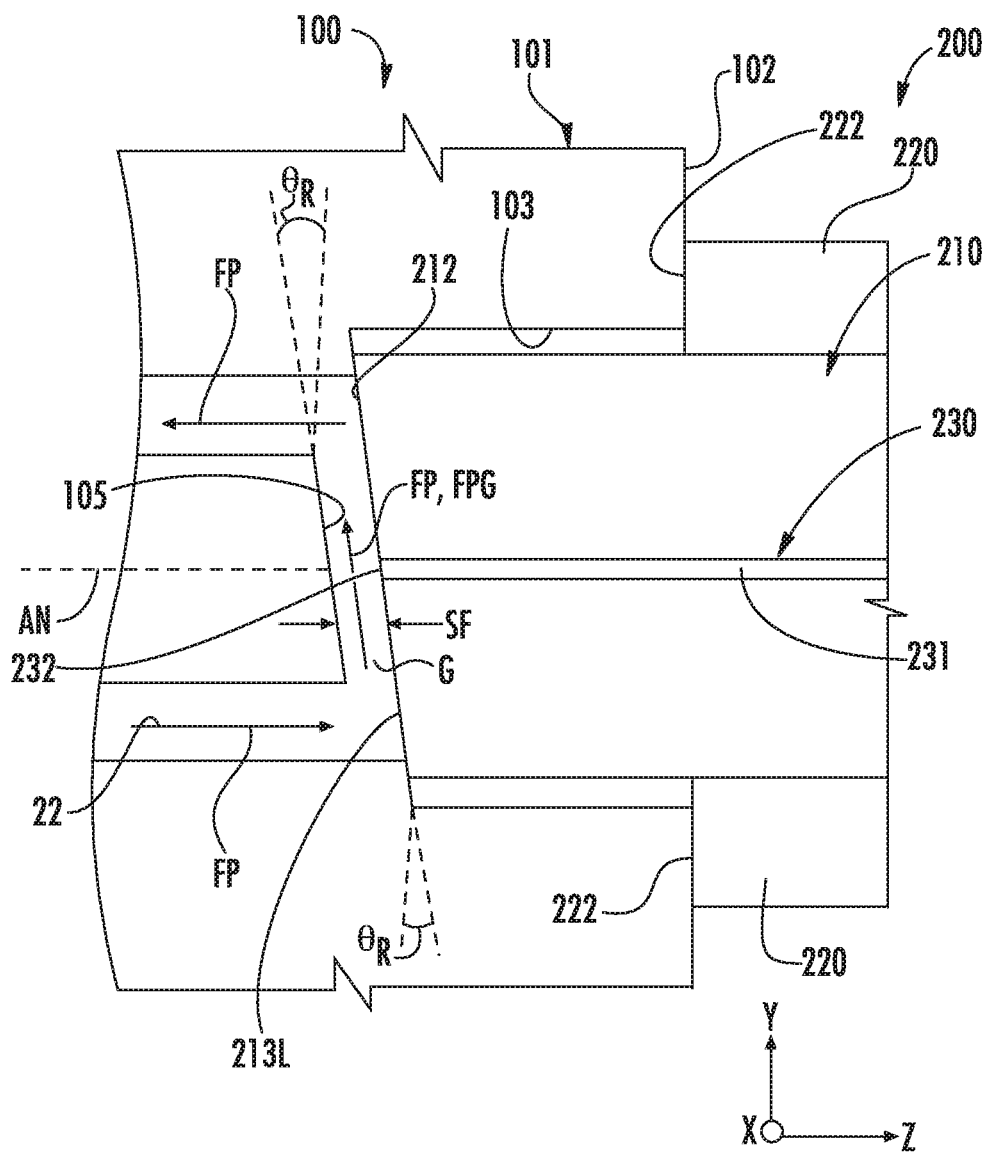
FIG. 3E is similar to FIG. 3D and illustrates an embodiment where the ferrule end face is angled and the front end of the nozzle is similarly angled so that the gap spacing is substantially constant.

FIG. 3E is similar to FIG. 3D and schematically illustrates an embodiment wherein the ferrule end face 212 defines the angle $\theta_R$ (e.g., 6° to 8°) relative to an x-y plane to reduce back reflections. In this embodiment, the front end 102 of the nozzle 100 is provided with a corresponding angle. For example, the recessed wall 105 can be similarly angled so that the gap spacing SF of the gap G is substantially constant.

Nozzle with Flow Disrupting Feature

Figure 4A:
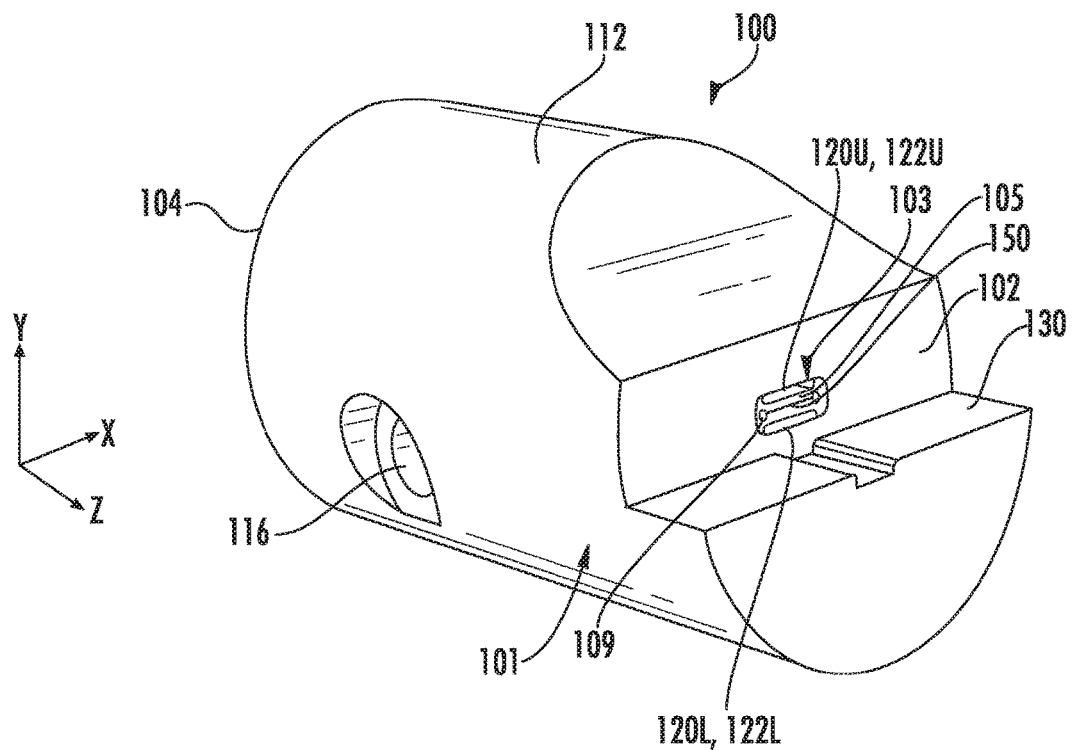
FIG. 4A is a front elevated view of another example nozzle that has a support ledge and that also has a flow disrupting feature.
Figure 4B:
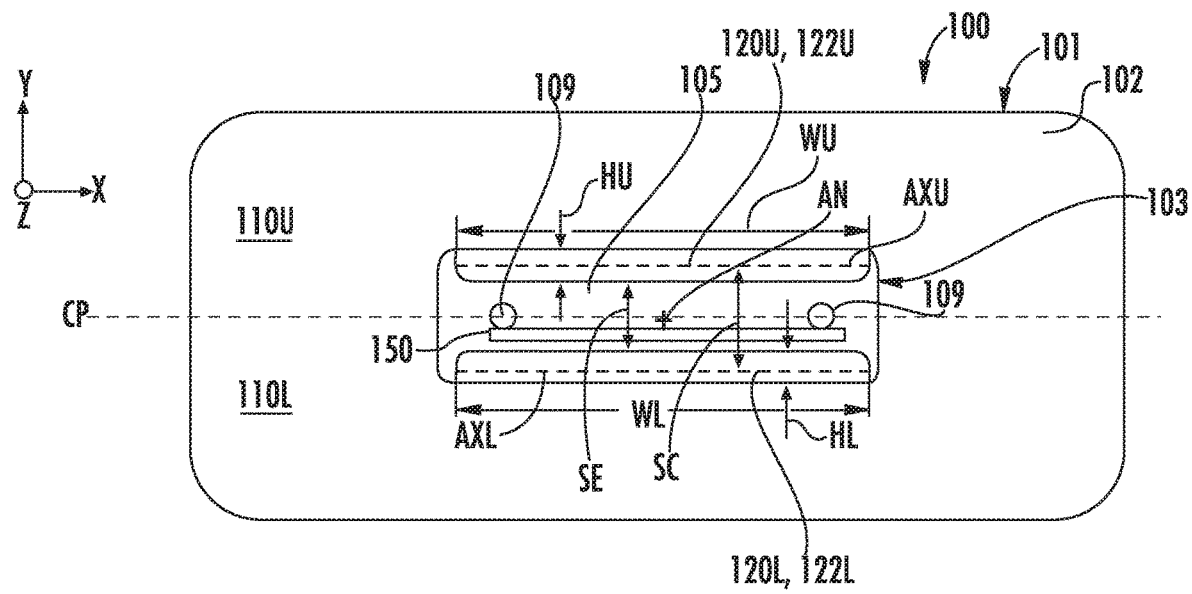
FIG. 4B is similar to FIG. 3C and shows the flow disrupting feature located on the recessed wall within the recess at the front end of the nozzle.
Figure 4C:
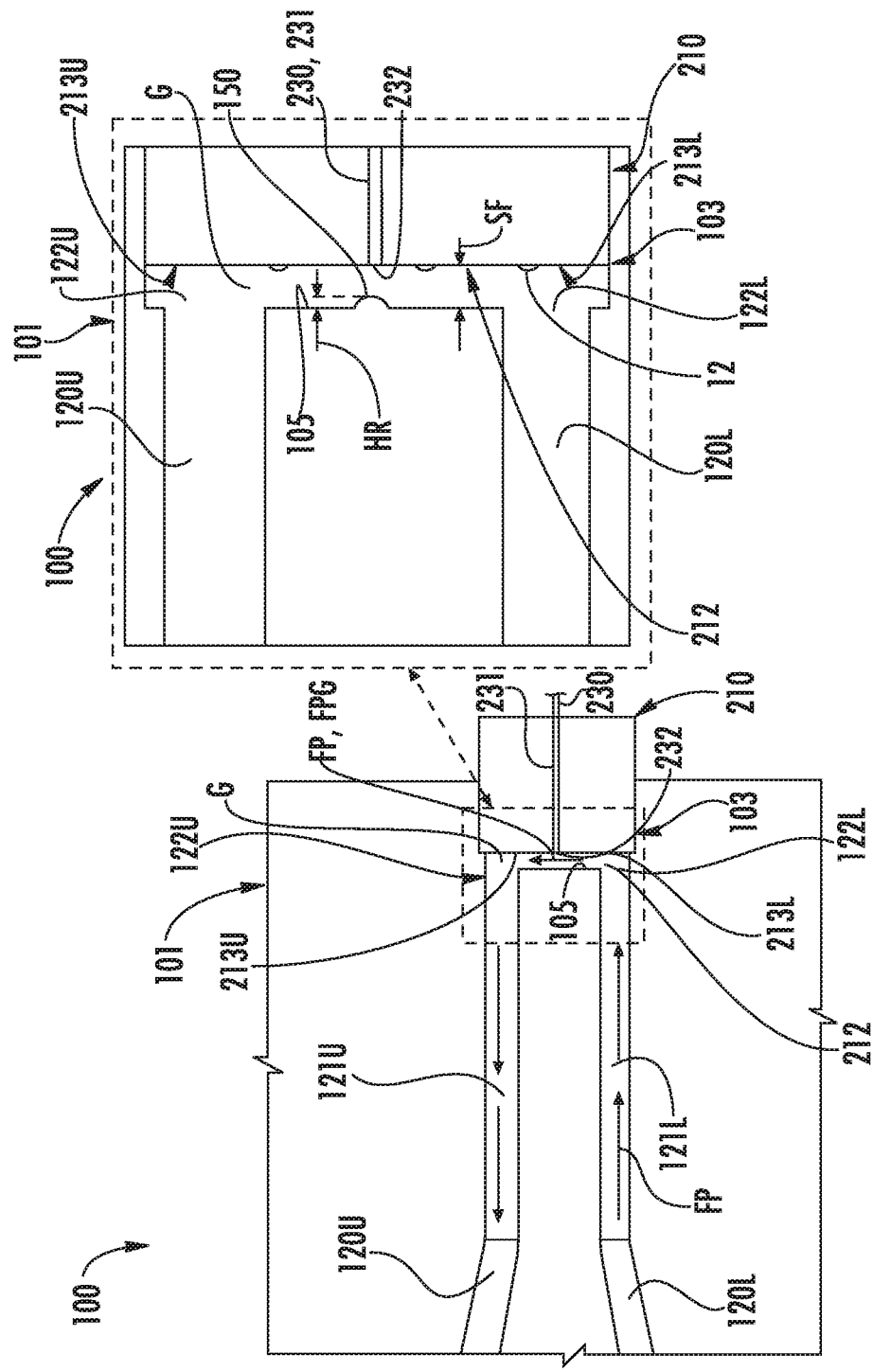
FIGS. 4C and 4D are y-z cross-sectional views of examples of the nozzle of FIG. 4A as operably engaged with the multi-fiber connector to form a nozzle assembly.
Figure 4D:
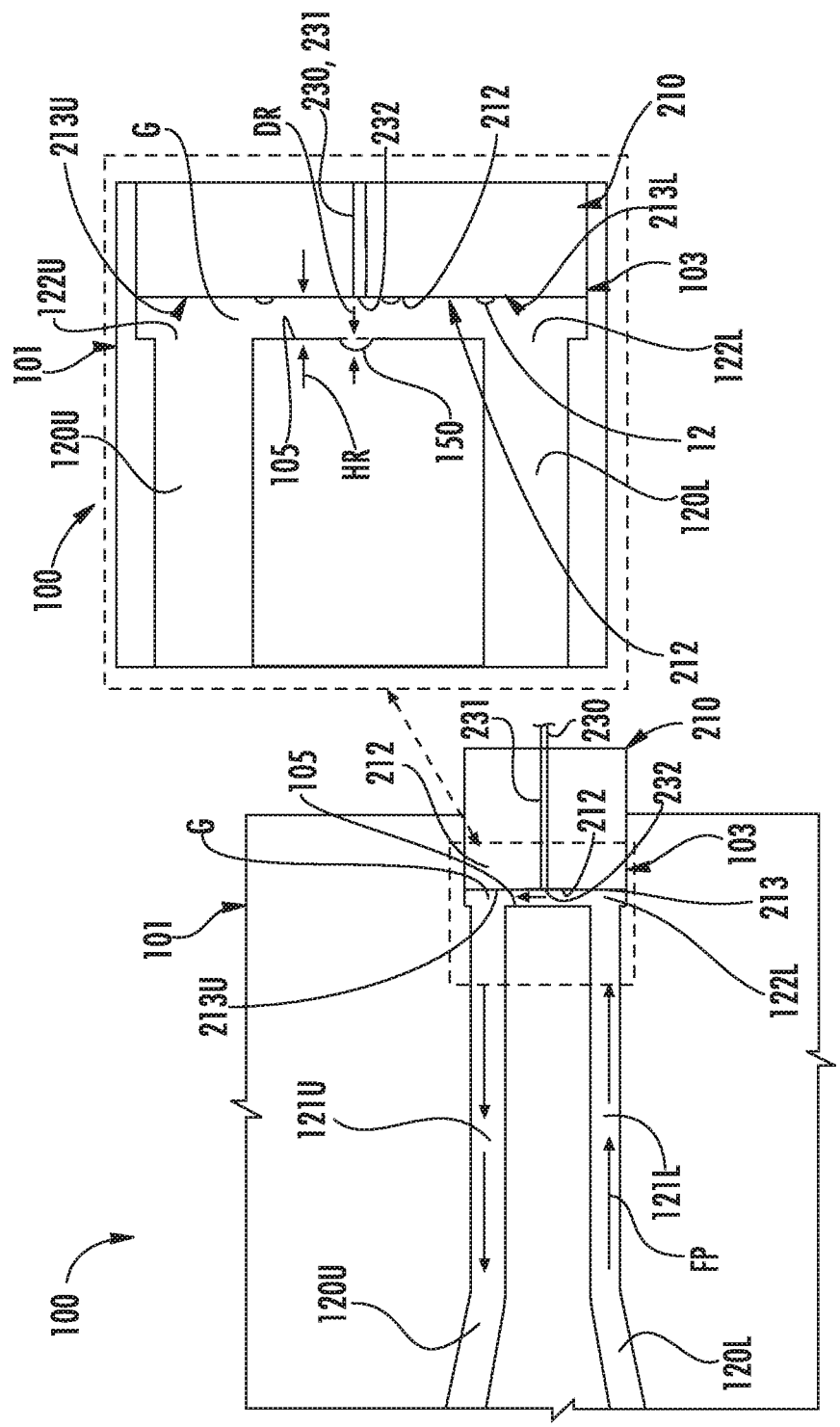

FIG. 4A is a front elevated view of an example nozzle 100. FIG. 4B is a close-up front-on view of the front end 102 and the recess 103 of the example nozzle 100 of FIG. 4A. FIGS. 4C and 4D are y-z cross-sectional views of examples of the nozzle 100 of FIG. 4A as operably engaged with the multi-fiber connector 200 to form an example nozzle assembly 140. The nozzle 100 of FIG. 4A is similar that shown in FIG. 3A but includes a ledge 130 at the front end 102 that is configured to support the multi-fiber connector 200 when the multi-fiber connector is operably engaged with the nozzle 100.

The nozzle 100 of FIG. 4A also includes at least one flow disrupting feature 150 on or in the recessed wall 105. In an example, the flow disrupting feature 150 runs in the x-direction and further in an example resides substantially midway between the first and second front-end openings 122L and 122U of the lower and upper channels 120L and 120U. In an example best seen in FIG. 4B, the flow disrupting feature 150 resides slightly closer to the first front-end opening 121L, i.e., slightly upstream of the midway point between the first and second front-end openings.

In one example as shown in FIG. 4C, the flow disrupting feature 150 can be in the form of a protrusion, which in an example has a height HR measured in the z-direction from the recessed surface 105 and in the range from $(0.001)SF \leq HR \leq (0.3)SF$. In an example, the protrusion can have a rounded (e.g., semicircular) cross-sectional shape or other cross-sectional shape. In another example shown in FIG. 4C, the flow disrupting feature 150 can be in the form of a groove.

The flow disrupting feature 150 is configured to generate a substantial local increase in the mean shear stress on its downstream side and further in an example can be used to introduce an oscillation of the shear stress by exploiting the von Karman vortex shedding phenomenon. The configuration (e.g., size and location) of the flow disrupting feature 150 as well as the size of the gap G can be selected to maximally or substantially increase the resulting shear stress around the fiber end faces 232 as compared to having no flow disrupting feature. In an example, a substantial increase in the shear stress is 10% or greater. The disruption of the flow of cleaning fluid 22 in the gap section FPG of the flow path FP by flow disrupting feature 150 does not change the general or overall direction of the flow of cleaning fluid 22, i.e., the flow is considered to be substantially in a single direction even when there is turbulence, and when the amount of turbulence varies of the flow path FP.

The increased turbulent flow and the creation of vortices downstream of the flow disrupting element 150 is localized and afterwards the cleaning fluid continues along the flow path FP to the first front-end opening 122U of the upper channel 120U. In this regard, the flow can be said to flow substantially only in a single direction since the flow disruption has no substantial effect on the overall direction of the flow over the flow path FP. On the other hand, the flow disrupting element 150 can substantially increase the shear stress of the flow of the cleaning fluid 22 along the flow path FP by impacting the flow velocity as a function of the z-coordinate, as described in greater detail below.

Figure 5:
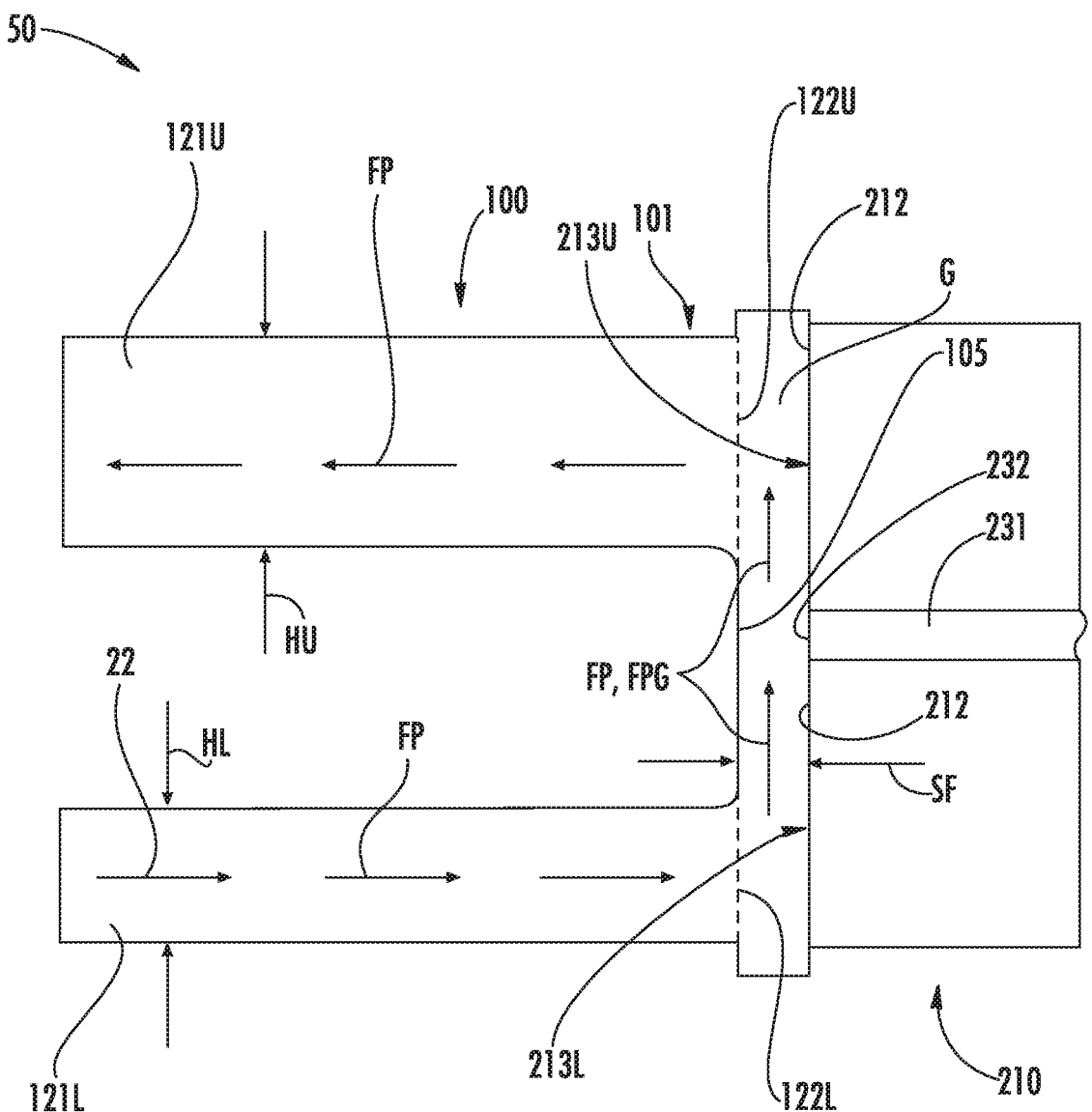
FIG. 5 is a schematic diagram of a computational domain for two-dimensional (2D) computational fluid dynamics (CFD) modeling of the nozzle assembly disclosed herein.

Two-dimensional (2D) computational fluid dynamic (CFD) simulations of the flow of cleaning fluid 22 associated with the configuration of the nozzle assembly 140 of FIGS. 4A and 4B were carried out using commercially available CFD software. FIG. 5 is a schematic diagram of the computational domain for 2D CFD modeling of the nozzle assembly 140. Air was used as the cleaning fluid 22. The air was flowed through the lower channel 120L into the gap G, where the air turned and flowed over the ferrule end face 212 and fiber end faces 232. The flow of air over the ferrule end face 212 generated a shear force that acted to dislodge particulates from the ferrule end face. The air then flowed out of the gap G through the upper channel 120U. The lower channel 120L had a channel height HL of 0.5 mm and the upper channel 120U had a channel channel height HU of 0.6 mm. The gap spacing SF was 0.2 mm.

Figure 6A:
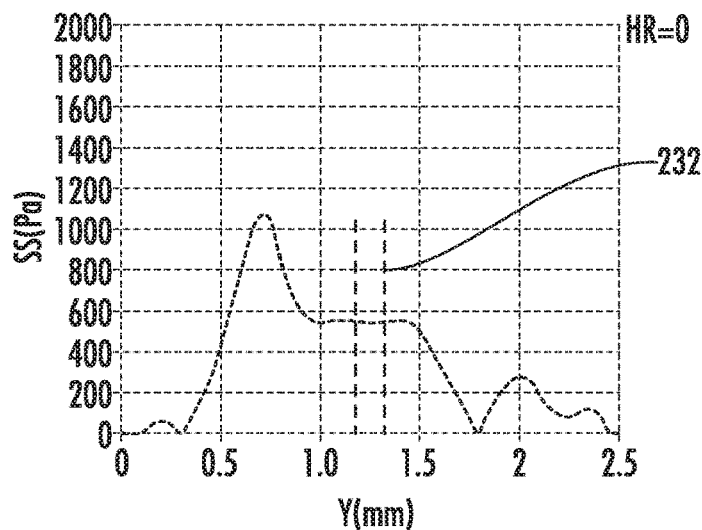
Figure 6B:
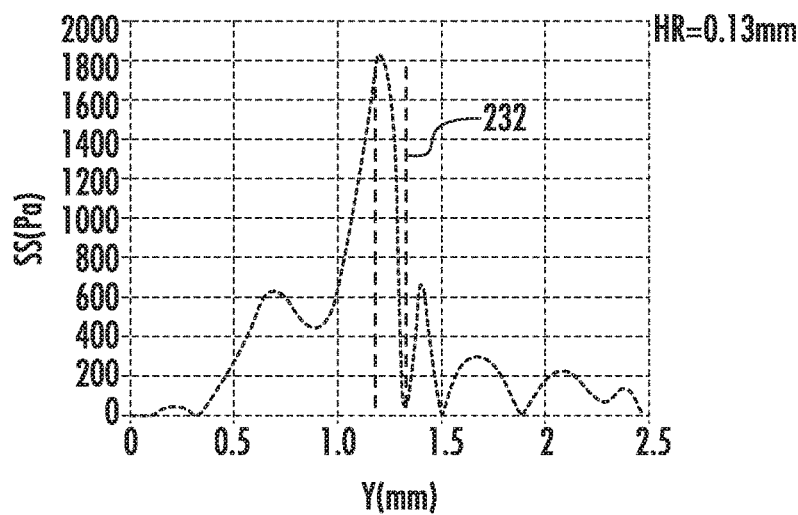
Figure 6C:
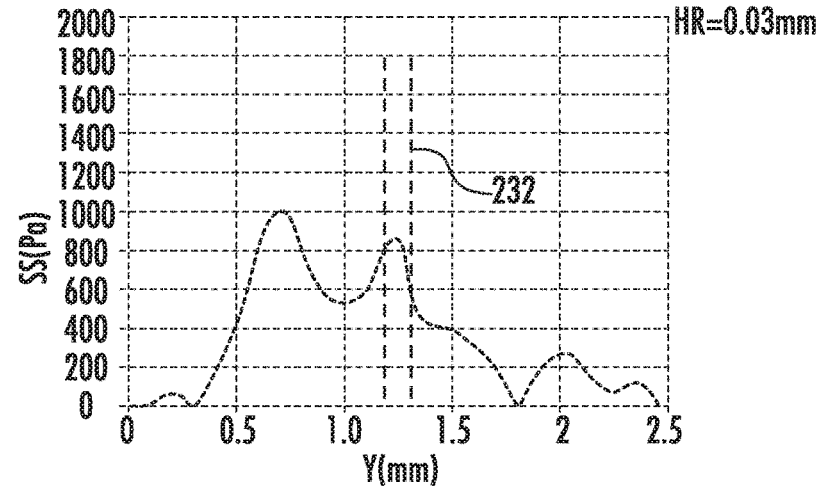

FIGS. 6A through 6C are plots of the wall shear stress SS (Pa) versus they position (mm) along the ferrule end face 212. The y-extent of the fiber end faces 232 is shown by the dashed vertical lines centered at y=1.125 mm. FIG. 6A is for no flow disrupting feature 150. FIG. 6B is for a flow disrupting feature 150 in the form of an elongate ridge with a hemispherical cross-section ("hemispherical ridge") having a height HR=0.13 mm. FIG. 6C is for a flow disrupting feature 150 in the form of a hemispherical ridge having a height HR=0.03 mm.

The plots of FIGS. 6A through 6C show that the nozzle 100 can generate a relatively high, uniformly distributed, shear stress along the ferrule end face 212, thereby providing consistent cleaning efficiency along the entire ferrule end face. The flow disrupting feature 150 generates a sharp increase in the shear stress SS at the location of the fiber end faces 232.

Figures 7A, 7B:
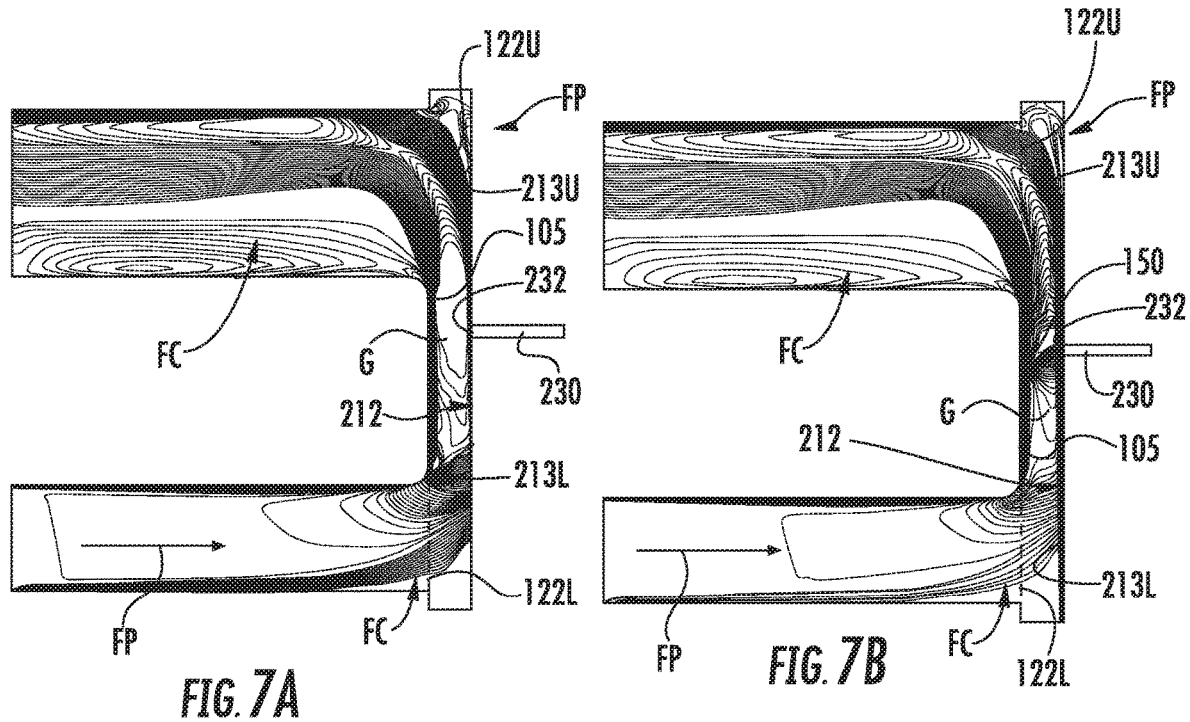
FIGS. 7A through 7C illustrate the flow contours of the flow paths for the cleaning fluid (air) for the three cases associated with FIGS. 6A through 6C, respectively.
Figure 7C:
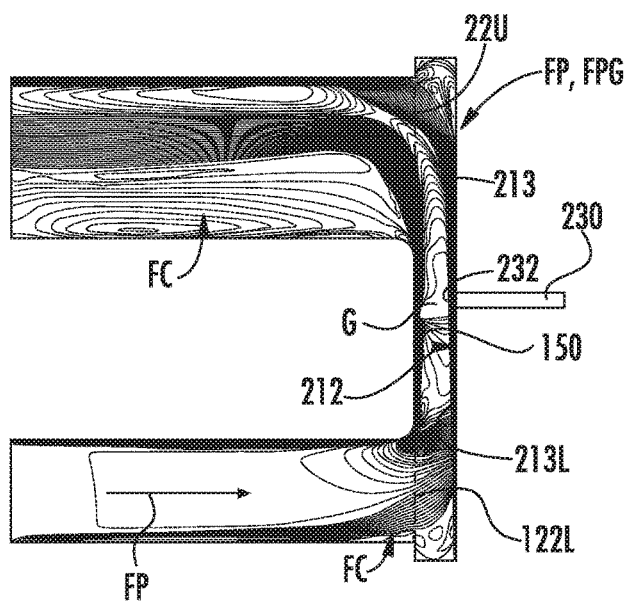

FIGS. 7A through 7C show the flow contours of the flow paths FP for the cleaning fluid 22 (taken as air) for the three cases (hereinafter as case A, case B and case C), associated with FIGS. 6A through 6C, respectively, for a typical operating inlet pressure $P_{in}$ of 7 psi. Contours that are closer together indicate a relatively high flow velocity and contours that are farther apart indicate a relatively low flow velocity. The change in spacing of the contours (i.e., the gradient of the contours) is representative of shear in the flow.

FIG. 7A shows that in case A there is a substantially uniformly distributed airspeed along the ferrule end face 212 as indicated by the tight flow contours right against the ferrule end face 212. FIG. 7B shows that in case B, the addition of the flow disrupting feature 150 in the form of a ridge with height HR=0.13 mm generates a higher flow speed especially at the fiber end faces 232. FIG. 7C shows that in case C, the smaller flow-disrupting feature 150 of height HR=0.03 mm (smaller than for case B) generates more uniform and faster flow along the ferrule end face 212 and produces the maximum airspeed at the fiber end faces 232.

Nozzle with Angled Inlet Flow Channel

Figure 8A:
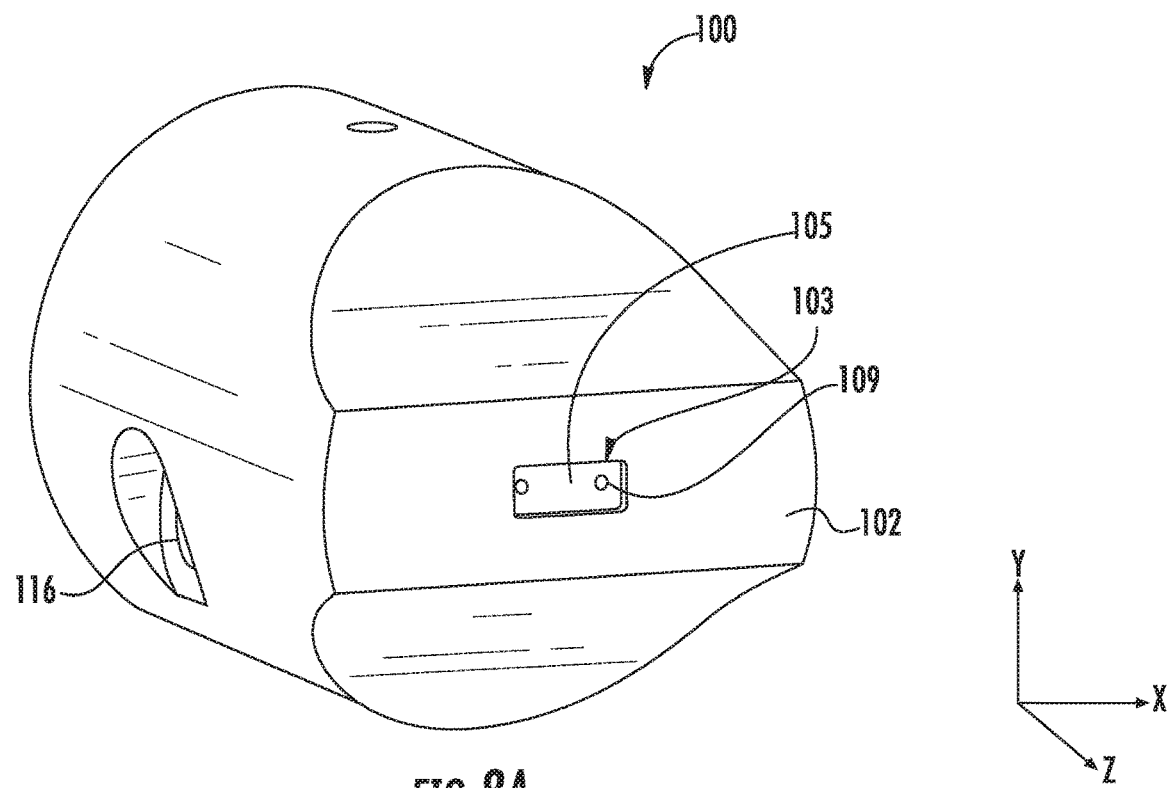
FIG. 8A is a front elevated view of another example of the nozzle as disclosed herein.
Figure 8B:
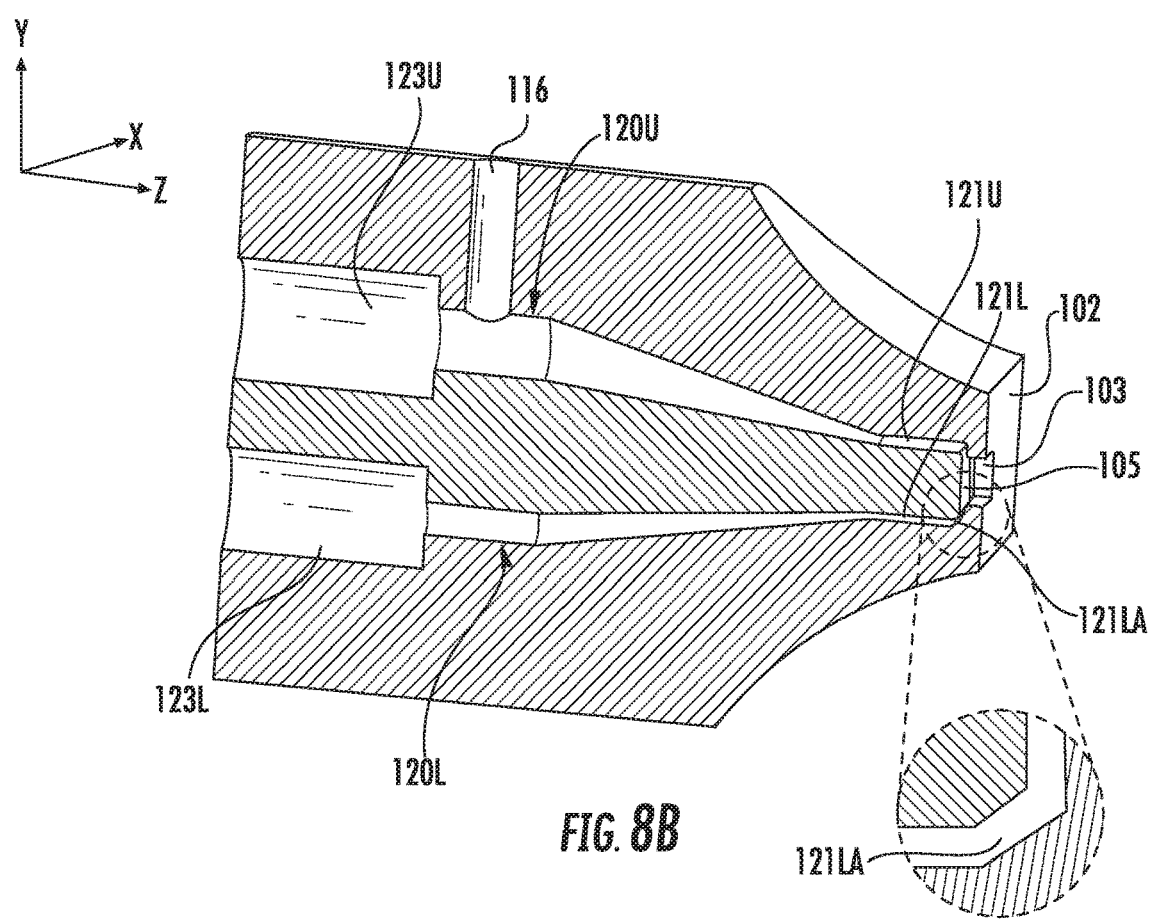
FIG. 8B is a y-z cross-sectional view of the nozzle of FIG. 8A and illustrating the angled channel section in the input (lower) channel.
Figure 8C:
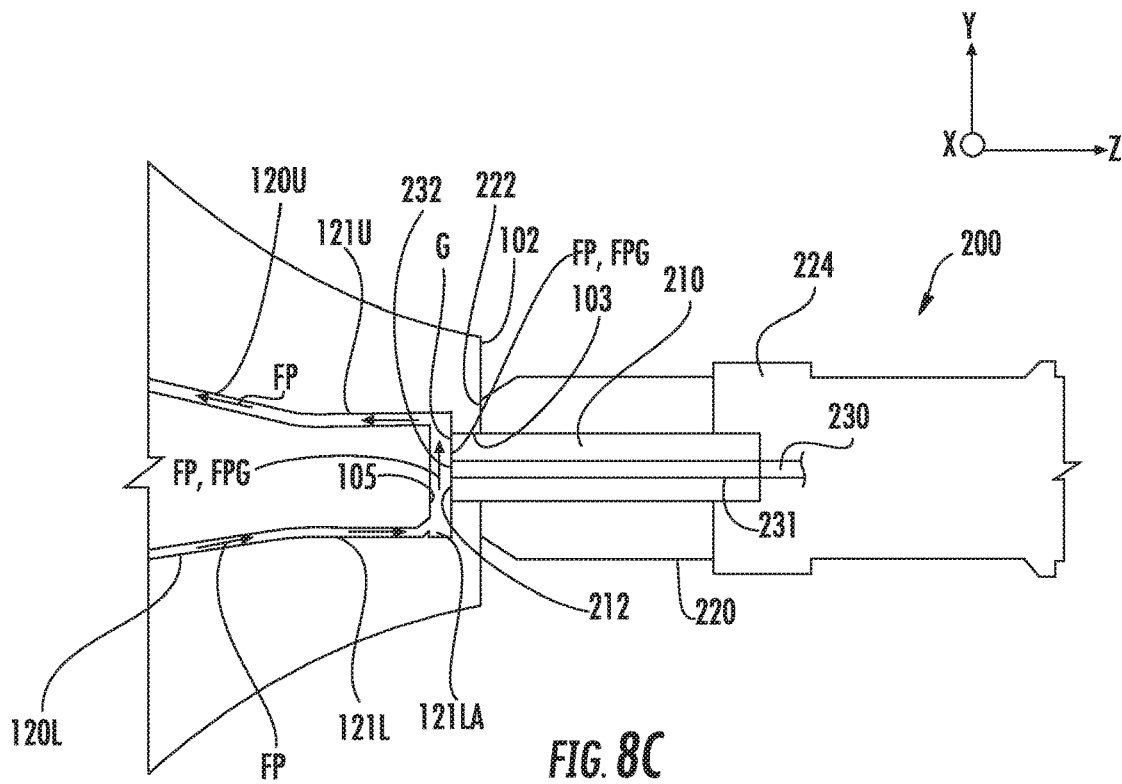
FIG. 8C is a y-z cross-sectional view of a nozzle assembly formed by the nozzle of FIG. 8A and a multi-fiber connector.
Figure 8D:
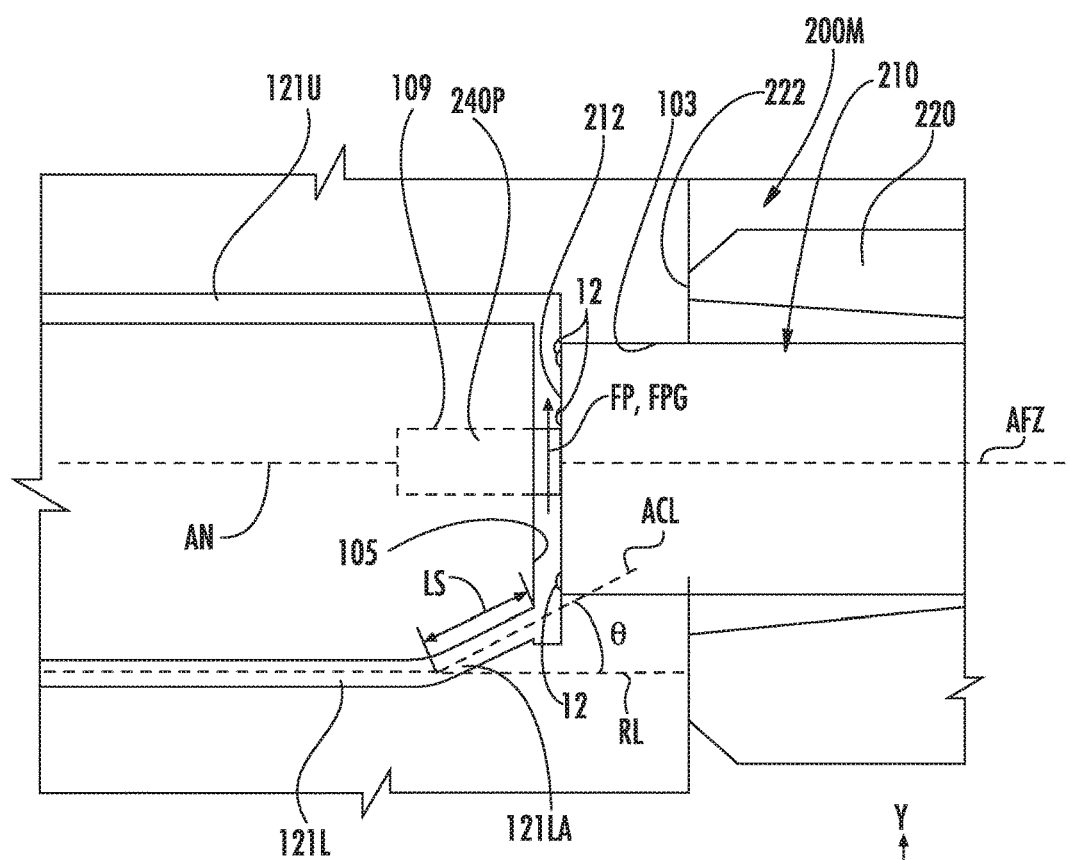
FIGS. 8D and 8E are a close-up y-z cross-sectional view of the nozzle assembly of FIG. 8C formed using a male multi-fiber connector (FIG. 8D) and a female multi-fiber connector (FIG. 8E), with each of these Figures showing the channel angle θ of the angled channel section.
Figure 8E:
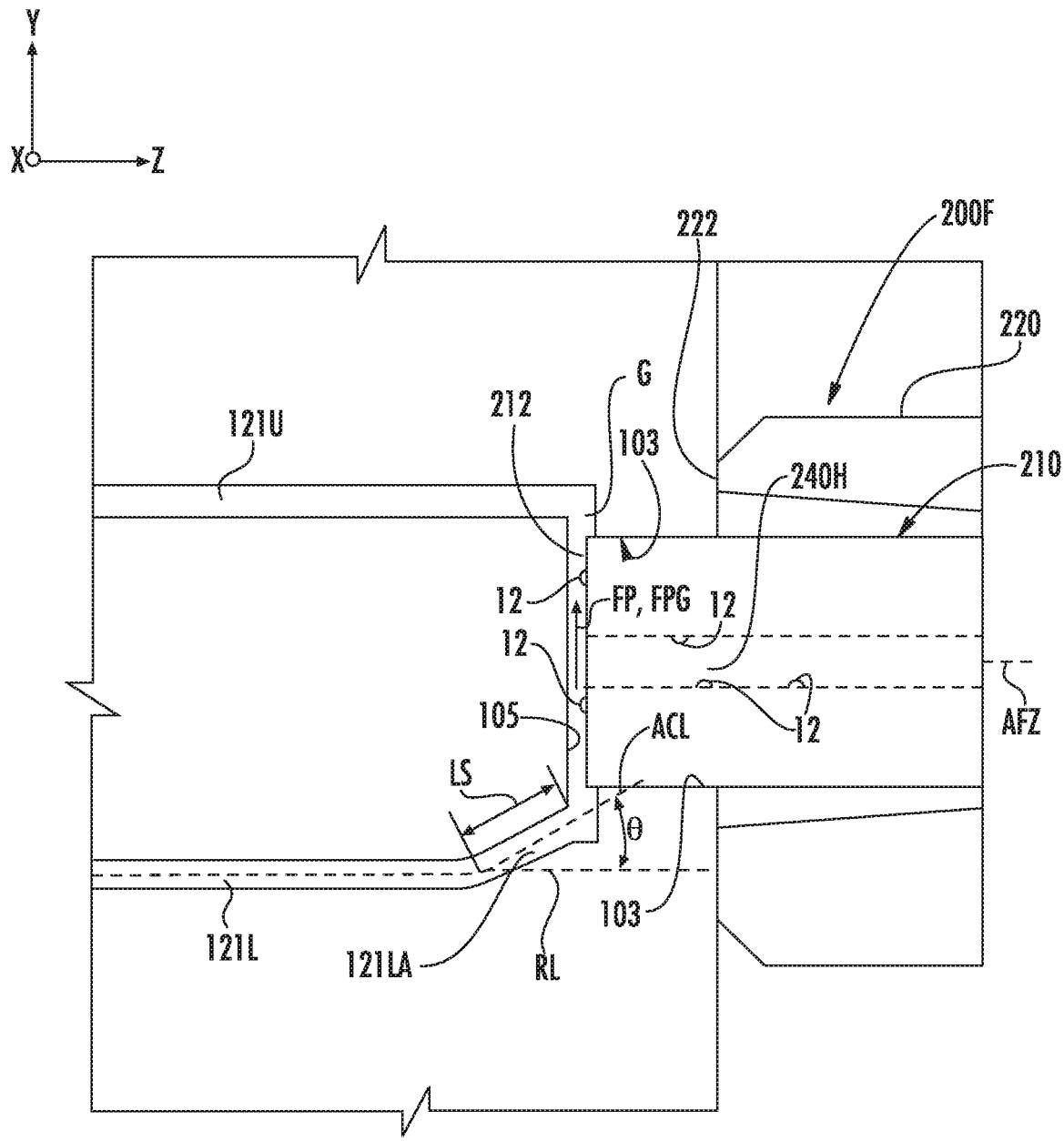

FIG. 8A is a front elevated view of an example nozzle 100 while FIG. 8B is a y-z cross-sectional view of the nozzle of FIG. 8A. FIG. 8C is similar to FIG. 8B but shows the multi-fiber connector 200 operably engaged with the nozzle 100. FIGS. 8D and 8E are close-up y-z cross-sectional views similar to FIG. 8C, with FIG. 8D showing a male multi-fiber connector 200M with alignment pins 240P and FIG. 8E showing a female multi-fiber connector 200F having alignment holes 240H. FIGS. 8D and 8E show debris 12 residing in the lee of the guide pins 240P and within the alignment holes 240H.

As best seen in FIGS. 8B through 8E, the nozzle 100 has the same basic configuration as the nozzles 100 described above, except that the front-end section 121L of the lower channel 120L serving as the inlet channel has an angled section 121LA immediately adjacent the first front-end opening 122L. Here, it is convenient to define a central or longitudinal channel axis AL for the lower channel 120L. The angled section 121LA is defined by a channel angle θ measured relative to the nozzle central axis AN. Thus, the channel angle θ can be measured between the central channel axis AL and a reference line RL that runs parallel to the nozzle central axis AN. In an example, the channel angle θ is in the range from 0°≤θ≤70°, with an exemplary channel angle being 60°.

The channel angle θ causes the cleaning fluid 22 to flow into gap G at an angle that is less than 90° relative to the ferrule end face 212. This results in an increase in the shear stress along the ferrule end face 212 as compared to a channel angle of θ=0°. The angled section has a length LS that can be any length that causes the flow path FP at the front-end section 121L of the inlet channel 120L to take on the channel angle θ when the cleaning fluid flows into the gap G from the inlet channel.

Figure 9:
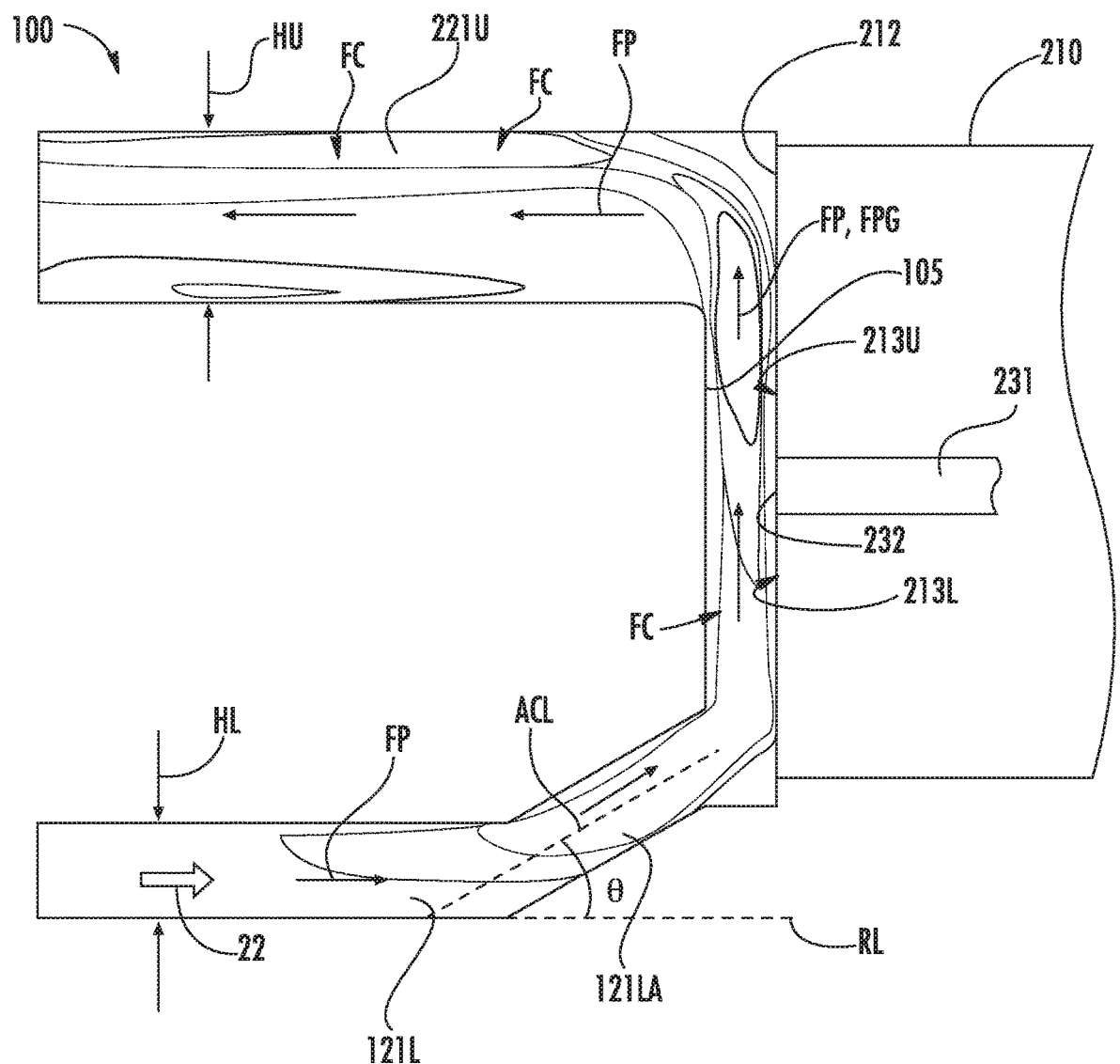
FIG. 9 is a schematic diagram of a computational domain for two-dimensional (2D) computational fluid dynamics (CFD) modeling of the nozzle assembly with the nozzle having an angled inlet channel and showing example flow contours.

FIG. 9 is a schematic diagram that illustrates the computational domain for the 2D CFD modeling of the flow of cleaning fluid 22 for the nozzle assembly 100 that employs the nozzle 100 of FIGS. 8A through 8E. Air was used as the cleaning fluid 22. In the simulations, the inlet pressure $P_{in}$ and vacuum pressure $P_{out}$ were specified as 8 psi and −2 psi, respectively. The simulations use a realizable k-epsilon model for turbulent flow. FIG. 9 also shows example flow contours.

Figure 10A:
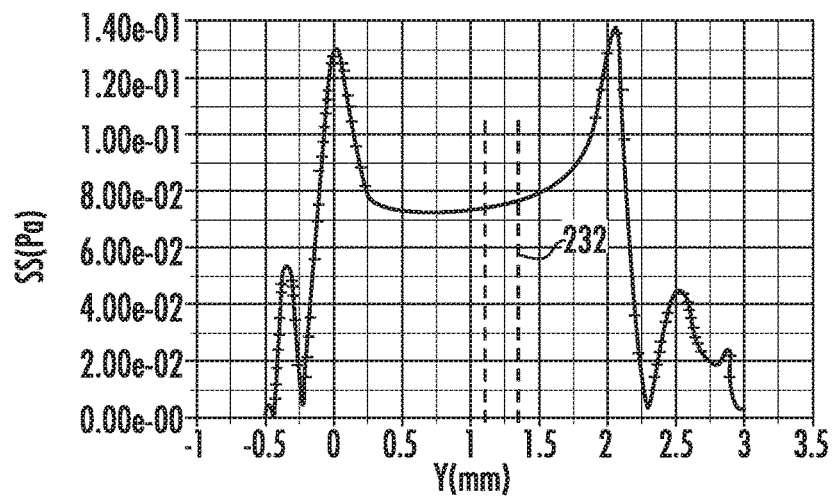
FIGS. 10A through 10C are plots of the shear stress SS (Pa) versus the y-position (mm) for different axial positions of the ferrule end face.
Figure 10B:
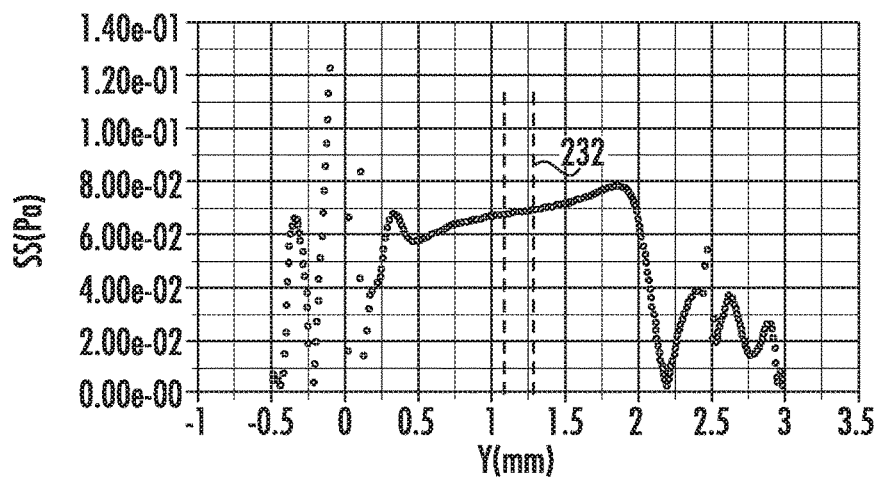
Figure 10C:
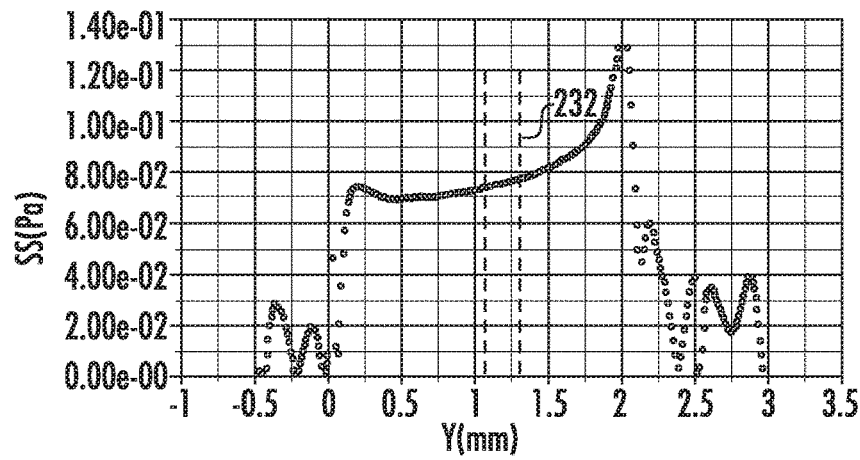
Figure 11A:
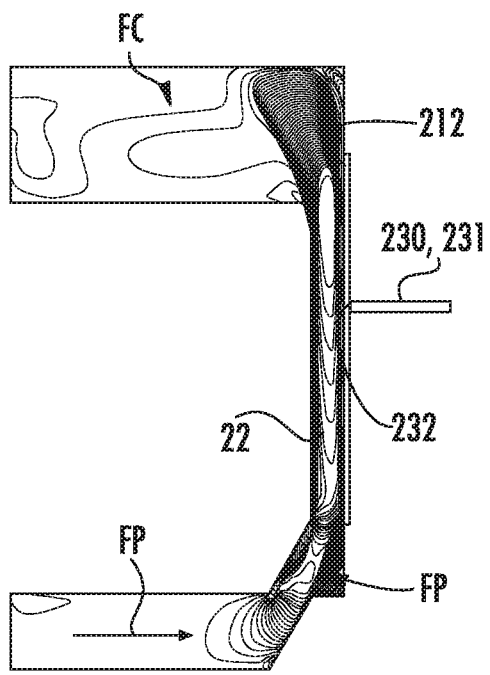
FIGS. 11A through 11C schematically illustrate the flow contours of the flow paths FP for the cleaning fluid for the positions of the ferrule end face corresponding to FIGS. 10A through 10C, respectively.
Figure 11B:
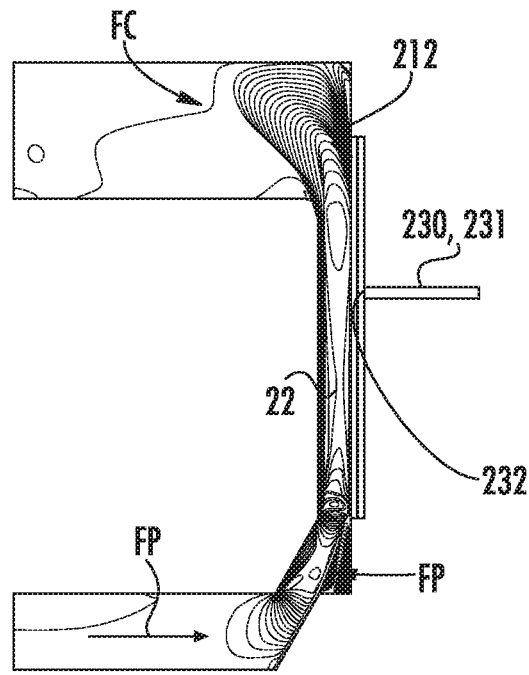
Figure 11C:
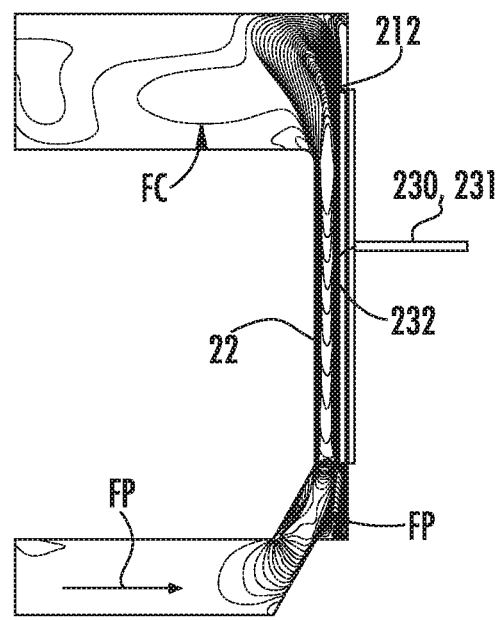

FIGS. 10A through 10C are plots of the shear stress SS (Pa) versus the y-position (mm) for different axial positions of the ferrule end face 212 based on simulations that assumed a flat ferrule end face. FIG. 10A is for a nominal position, FIG. 1013 is for a displacement in the in the +z direction (i.e., away from the recessed wall 105) by 0.05 mm and FIG. 10C is for a displacement in the −z direction (toward the recessed wall 105) by 0.05 mm. The location of the fiber end faces 232 is shown as vertical lines. FIGS. 11A through 11C schematically illustrate the flow contours for the flow paths FP for the cleaning fluid 22 (air) for the three cases associated with FIGS. 10A through 10C, respectively.

As the air flows through the inlet channel 120L and makes its turn at ferrule end face 212, it generates at the ferrule end face a shear force that serves to dislodge particulates therefrom. FIGS. 11A through 11C show how the flow path FP changes as a function of the z-position of the ferrule end face 212, but with each position showing a relatively strong amount of shear stress SS at the ferrule end face.

Figure 12A:
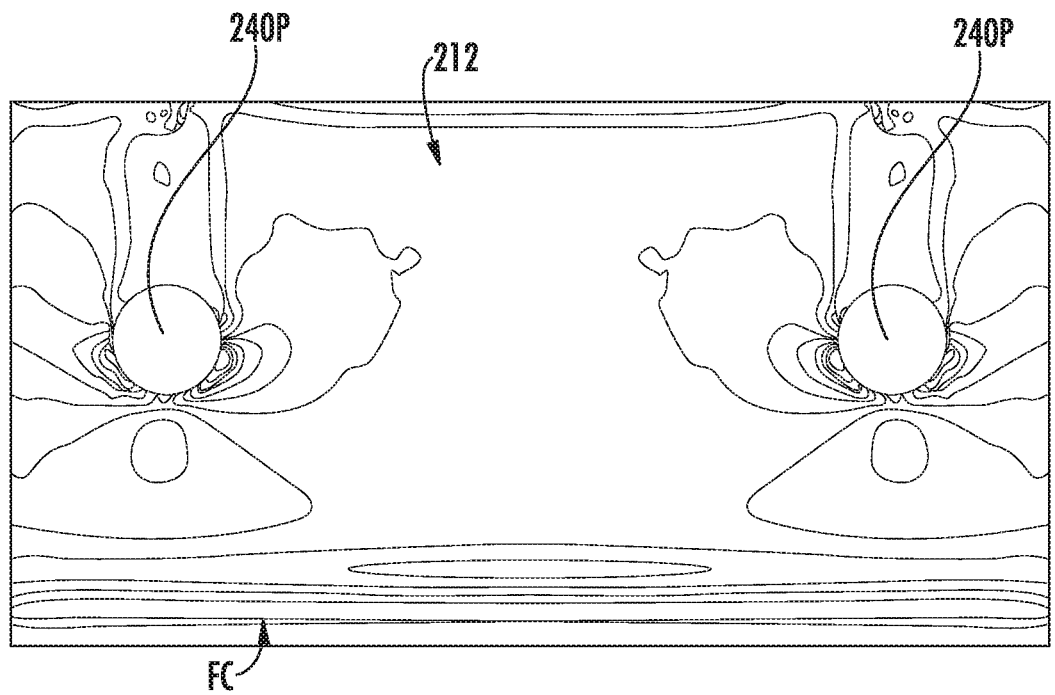
FIGS. 12A and 12B are contour plots of the shear stress at the ferrule end face for a male multi-fiber connector (FIG. 12A) and a female multi-fiber connector (FIG. 12B) for identical conditions based on 2D CFD simulations.
Figure 12B:
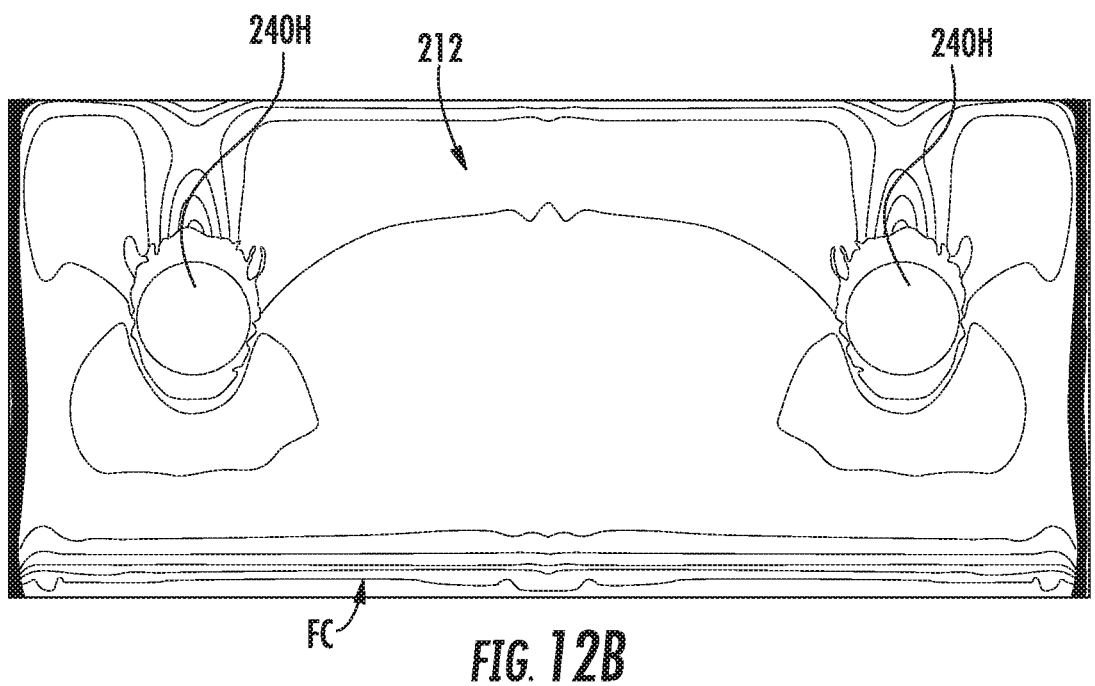

FIGS. 12A and 12B are contour plots of the shear stress at the ferrule end face 212 for a male multi-fiber connector 100M (FIG. 12A) and a female multi-fiber connector 100F (FIG. 12B) for identical conditions based on 2D CFD simulations. FIGS. 12A and 12B show that, except near the alignment pins 240P and the alignment holes 240H, the shear stress is relatively uniform along the ferrule end face.

Figure 13:
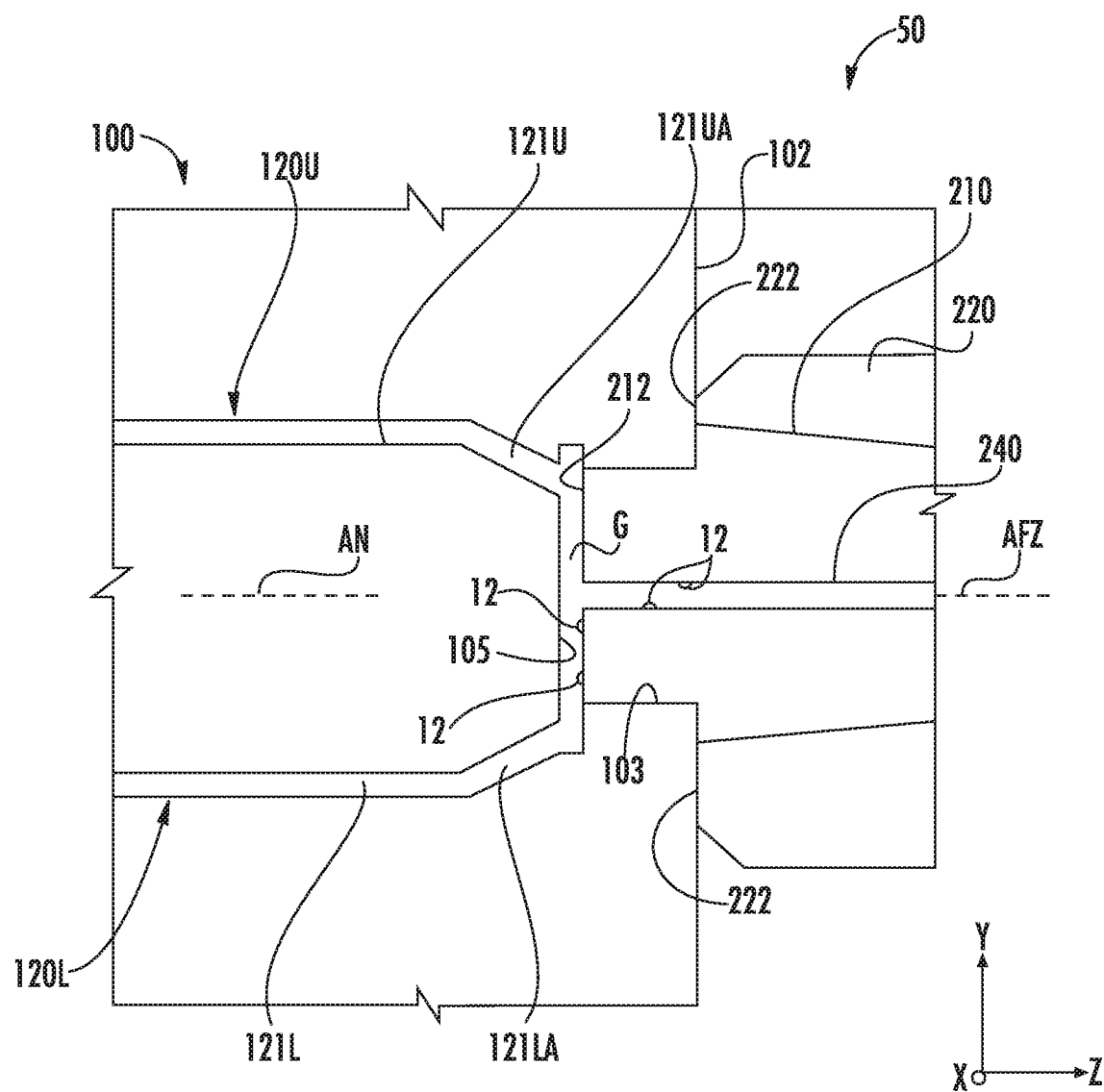
FIG. 13 is a close-up y-z cross-sectional view of an example nozzle assembly wherein the inlet and outlet channels of the nozzle each have an angled section adjacent the respective front-end channel openings.

FIG. 13 is similar to FIG. 8E and illustrates an example configuration for nozzle 100 wherein the front-end section 121U of the upper channel 120U includes an angled outlet channel section 121UA that matches the angled inlet channel section 121LA of the lower channel 120L, i.e., the front-end sections 121L and 121U of the lower and upper channels 120L and 120U are symmetric. This configuration allows the direction of the flow path FP of the cleaning fluid 22 to be reversed while taking advantage of the angled input of cleaning fluid 22 from the lower and upper channels 120L and 120U, thereby providing a further advantage for achieving efficient debris removal. This is particularly true for debris 12 that can be stuck in the lee of the alignment pins 240P or the alignment holes 240H (see also FIGS. 8D and 8E), or for debris that for some reason does not dislodge when the flow path FP is in one direction only.

For the two-directional flow embodiment, the cleaning fluid delivery system 20 is configured to provide flow of the cleaning fluid 22 in opposite directions (i.e., is capable of flow reversal). The flow of cleaning fluid 22 can be conducted in a manner that debris 12 that has been removed does not return to ferrule end face 212 from the lower channel 120L or the upper channel 120U. For example, the cleaning fluid 22 can be flowed for a duration in each direction sufficient to flush out the cleaning fluid and entrained particulates that reside in the gap G as well as in either the lower channel 120L or the upper channel 120U. In an example, two flow disrupting features 150 can be symmetrically arranged about the center plane CP to account for the original direction of the flow of cleaning fluid 22 as well as for the reversed direction of the flow.

The design of multi-fiber connectors 200 makes it challenging to ensure a well-defined spacing SF for the gap G. For example, the connector housing 220 may not be precisely positioned with respect to the ferrule 210 so that the ferrule end face 212 can protrude from the front end 222 of the connector housing 220 by an amount which can vary over a range of about 0.5 mm (e.g., by about 400 µm).

Figure 14:
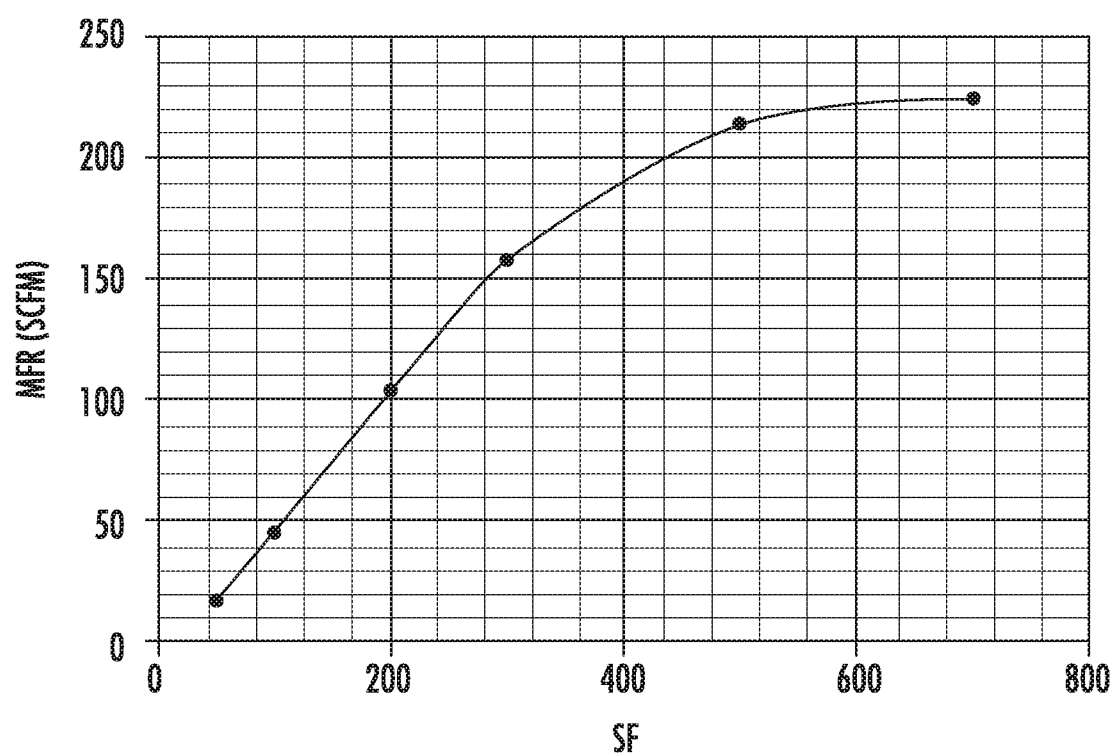
FIG. 14 is a plot of the mass flow rate MFR (SCFM) for the cleaning fluid (air) as a function of the gap spacing SF (μm) based on 2D CFM simulations.

As discussed above, the position of the ferrule end face 212 when the connector housing 220 is engaged by the nozzle 100 changes the size of the gap G, which in turn can affect the flow of the cleaning fluid, especially over the gap section FPG of the flow path FP. FIG. 14 is a plot of the mass flow rate MFR (SCFM) for the cleaning fluid 22 as a function of the gap spacing SF (µm) based on 2D CFM simulations. The absolute mass flow rates are best interpreted as relative values rather than as absolute values given the 2D modeling approximation. The nozzle inlet and outlet pressures were held at 8 psi and −2 psi respectively, and flow-dependent pressure drops were ignored.

The plot of FIG. 14 shows the strong dependence of the mass flow rate on the gap spacing SF, with a gap spacing SF of about 150 µm considered optimum for the given nozzle design. The plot also shows that for gap spacings SF greater than 400 µm, the flow rate rises less quickly, which is most likely due to the size of the inlet and outlet channels 120L and 120U. Thus, in an example, the gap spacing SF is selected to provide a select mass flow rate of the cleaning fluid 22 over the gap section FPG of the flow path FP.

In an example, the relative position of ferrule end face 212 is defined by the gap spacing SF and is controlled to within a tolerance of ±50 µm from an optimum value, which in an example is the value that provides the maximum shear stress over either a select portion of the ferrule end face 112 that includes the fiber end faces 232, or over the largest portion of the ferrule end face that includes the fiber end faces. In an example, the gap spacing SF can be adjusted by axial movement of at least one of the nozzle 100 and the connector 200 to achieve desired flow characteristics.

Advantageously, the inlet pressure $P_{in}$ and vacuum pressure $P_{out}$ for the nozzle 100 may also be controlled during operation to help maintain a desired gap spacing SF. For example, it was mentioned above how in some embodiments the front end 222 of connector housing 220 contacts the front end 102 of nozzle 100 and defines the gap spacing SF (see, e.g., FIGS. 3C and 3E). If a negative average pressure is maintained in the gap section FPG of the flow path FP, there is a "self-sealing" effect. That is, the nozzle 100 experiences a suction force that tends to maintain contact between the front end 102 of nozzle 100 and the front end 222 of connector housing 220. The contact may serve as a seal and prevent the leakage of cleaning fluid from the flow path FP.

It is possible to achieve the above-mentioned "self-sealing" effect without necessarily making the vacuum pressure $P_{out}$ greater than the inlet pressure $P_{in}$. Due to the shape of the nozzle 100 and gap section FPG, there may be variations in pressure along the gap section FPG that still result in an overall negative pressure when $P_{in}$ is greater than $P_{out}$. For example, in some embodiments, an inlet pressure $P_{in}$ of 7 psi and vacuum pressure $P_{out}$ of −3 psi may still result in a negative average pressure along the gap section FPG.

When nozzle 100 is employed to clean female multi-fiber connectors 200, the cleaning fluid 22 can be flowed within the gap section FPG of the flow path FP in a manner that creates a positive net pressure over the one or more alignment holes 240H. This positive net pressure can be made great enough to remove at least a portion of the debris 12 residing in the alignment holes. Alternatively, or in addition to the aforementioned hole-cleaning process, a cleaning cycle can be carried out wherein cleaning fluid 22 is flowed through the alignment holes 240H.

It will be apparent to those skilled in the art that various modifications to the preferred embodiments of the disclosure as described herein can be made without departing from the spirit or scope of the disclosure as defined in the appended claims. For example, although the center plane CP divides the body 110 of nozzle 100 into lower half 110L and upper half 110U, in some embodiments the body 110 may be asymmetric. It can more generally be said that the center plane CP divides the body 110 into first and second portions (e.g., a lower portion 110L and upper portion 110U) to account for such embodiments. There may also be embodiments where the body 110 is shaped such that x-z or y-z planes ("longitudinal planes") located between the first and second front-end openings 122L and 122U of the respective first and second channels 120L and 120U do not include the central axis AN. Thus, even more generally, it can be said that: a) the body 110 includes a longitudinal axis that runs in the first direction (i.e., the z-direction) that is not necessarily—but could be—central axis AN, b) a longitudinal plane (i.e., x-z or y-z plane) between the first and second front-end openings 122L and 122U includes the longitudinal axis and divides the body into lower and upper portions 120L and 120U, and c) the first and second channels 120L and 120U reside in the lower and upper portions.

Thus, the disclosure covers these and other modifications and variations provided they come within the scope of the appended claims and the equivalents thereto.

What is claimed is:

1. A nozzle assembly for cleaning a multi-fiber connector having a ferrule with an elongate end face, comprising:
   a multi-fiber connector having a ferrule with an elongate end face;
   a nozzle body having a front end and a back end, the front end having a recess defining a recessed wall, a cross-sectional shape of the recess being elongate in a first direction and the recess sized to receive a front-end section of the ferrule that includes the elongate end face;
   a first channel residing in the nozzle body and having a cross-sectional shape elongate in the first direction, the first channel having a first front-end opening at the recessed wall; and
   a second channel residing in the nozzle body and having a cross-sectional shape elongate in the first direction, the second channel having a second front-end opening at the recessed wall;
   wherein the first and second front-end openings are spaced apart in a second direction perpendicular to the first direction;
   wherein the front-end section of the ferrule is received in the recess to define a gap between the ferrule end face and the recessed wall, and wherein the gap defines a section of a flow path between the first and second front-end openings of the first and second channels.

2. The nozzle assembly according to claim 1, wherein:
   the nozzle body includes a longitudinal axis perpendicular to the first and second directions and a longitudinal plane including the longitudinal axis;
   the longitudinal plane is located between the first and second front-end openings and divides the nozzle into a lower portion and an upper portion; and
   the first channel resides in the lower portion of the nozzle body and the second channel resides in the upper portion of the nozzle body.

3. The nozzle assembly according to claim 2, wherein the longitudinal axis runs through a center of the nozzle body, and wherein the upper and lower portions are respective upper and lower halves of the nozzle body.

4. The nozzle assembly according claim 1, wherein the elongate end face has a height-HF and wherein the first and second front-end openings are spaced apart by an edge-to-edge spacing SE in the range $(0.01)HF \leq SE \leq (0.8)HF$.

5. The nozzle assembly according to claim 1, wherein the first and second channels each have a cross-sectional shape that is either rectangular or rounded rectangular.

6. The nozzle assembly according to claim 1, wherein the elongate end face has a height HF, wherein the first and second front-end openings have respective first and second axes that are parallel and spaced apart by a center to center spacing SC in the range $(0.01)HF \leq SC \leq (0.9)HF$.

7. The nozzle assembly according to claim 1, wherein the first channel includes a first front-end section that defines the first front-end opening and the second channel includes a second front-end section that defines the second front-end opening, and wherein the first front-end section of the first channel and the second front-end section of the second channel are substantially parallel.

8. The nozzle assembly according to claim 1, wherein the elongate end face has a height HF, and wherein the first and second front-end openings have respective heights HL and HU in the second direction, and wherein $(0.01)HF \leq \{HL, HU\} \leq (0.5)HF$.

9. The nozzle assembly according to claim 1, wherein the recessed wall includes one or more holes sized to accommodate alignment pins of the multi-fiber connector.

10. The nozzle assembly according to claim 1, wherein there is no other channel that resides within the nozzle body and that has an opening at the recessed wall.

11. The nozzle assembly according to claim 1, wherein the recessed wall includes a flow disrupting feature that resides between the first and second front-end openings.

12. The nozzle assembly according to claim 11, wherein the flow disrupting feature comprises a protrusion that is elongate in the first direction.

13. The nozzle assembly according to claim 12, wherein the elongate end face has a height HF and wherein the protrusion has a height HR measured from the recessed wall, and wherein $(0.001)HF \leq HR \leq (0.3)HF$.

14. The nozzle assembly according to claim 12, wherein the protrusion has rounded cross-section.

15. The nozzle assembly according to claim 1, wherein the first channel includes a first angled section that includes the first front-end opening.

16. The nozzle assembly according to claim 15, wherein the first angled section defines a channel angle θ in the range 0°≤θ≤70° as measured relative to a nozzle central axis.

17. The nozzle assembly according to claim 1, wherein:
the nozzle body includes a back end opposite the front end and an outer surface between the front end and the back end;
the first channel includes a first back-end opening at the back end of the nozzle body or in the outer surface of the nozzle body; and
the second channel includes a second back-end opening at the back end of the nozzle body or in the outer surface of the nozzle body.

18. A nozzle assembly, comprising:
a multi-fiber connector comprising a ferrule having a front-end section that is elongate and that includes a ferrule end face; and
multiple optical fibers each having an end portion supported by the ferrule and a fiber end face that resides at or proximate to the ferrule end face; and
a nozzle that includes:
a nozzle body having a front end and a back end, the front end having a recess defining a recessed wall, a cross-sectional shape of the recess being elongate in a first direction and the recess sized to receive the front-end section of the ferrule;
a first channel residing in the nozzle body and having a cross-sectional shape elongate in the first direction, the first channel having a first front-end opening at the recessed wall;
a second channel residing in the nozzle body and having a cross-sectional shape elongate in the first direction, the second channel having a second front-end opening at the recessed wall;
wherein the first and second front-end openings are spaced apart in a second direction perpendicular to the first direction; and
wherein the front-end section of the ferrule is received in the recess to define a gap between the ferrule end face and the recessed wall, and wherein the gap defines a section of a flow path between the first and second front-end openings of the first and second channels.

19. The nozzle assembly according to claim 18, wherein the nozzle body has a nozzle central axis perpendicular to the first and second directions, and wherein the gap has an axial width SF measured in the direction of the nozzle central axis and in the range 0.1 mm≤SF≤1 mm.

20. The nozzle according to claim 18, wherein:
the nozzle body includes a longitudinal axis perpendicular to the first and second directions and a longitudinal plane including the longitudinal axis;
the longitudinal plane is located between the first and second front-end openings and divides the nozzle into a lower portion and an upper portion; and
the first channel resides in the lower portion of the nozzle body and the second channel resides in the upper portion of the nozzle body.

21. The nozzle according to claim 20, wherein the longitudinal axis runs through a center of the nozzle body, and wherein the upper and lower portions are respective upper and lower halves of the nozzle body.

22. The nozzle according claim 18, wherein the ferrule end face has a height-HF and wherein the first and second front-end openings are spaced apart by an edge-to-edge spacing SE in the range (0.01)HF≤SE≤(0.8)HF.

23. The nozzle according to claim 18, wherein the first and second channels each have a cross-sectional shape that is either rectangular or rounded rectangular.

24. The nozzle according to claim 18, wherein the ferrule end face has a height HF, wherein the first and second front-end openings have respective first and second axes that are parallel and spaced apart by a distance SC in the range (0.01)HF≤SC≤(0.9)HF.

25. The nozzle according to claim 18, wherein the first channel includes a first front-end section that defines the first front-end opening and the second channel includes a second front-end section that defines the second front-end opening, and wherein the first front-end section of the first channel and the second front-end section of the second channel are substantially parallel.

26. The nozzle according to claim 18, wherein the ferrule end face has a height HF, and wherein the first and second front-end openings have respective heights HL and HU in the second direction, and wherein (0.01)HF≤{HL, HU}≤(0.5)HF.

27. The nozzle according to claim 18, wherein the recessed wall includes one or more holes sized to accommodate alignment pins of the multi-fiber connector.

28. The nozzle according to claim 18, wherein there is no other channel that resides within the nozzle body and that has an opening at the recessed wall.

29. The nozzle according to claim 18, wherein the recessed wall includes a flow disrupting feature that resides between the first and second front-end openings.

30. The nozzle according to claim 29, wherein the flow disrupting feature comprises a protrusion that is elongate in the first direction.

31. The nozzle according to claim 30, wherein the ferrule end face has a height HF and wherein the protrusion has a height HR measured from the recessed wall, and wherein (0.001)HF≤HR≤(0.3)HF.

32. The nozzle according to claim 30, wherein the protrusion has rounded cross-section.

33. The nozzle according to claim 18, wherein the first channel includes a first angled section that includes the first front-end opening.

34. The nozzle according to claim 33, wherein the first angled section defines a channel angle θ in the range 0°≤θ≤70° as measured relative to a nozzle central axis.

35. The nozzle according to claim 18, wherein:
the nozzle body includes a back end opposite the front end and an outer surface between the front end and the back end;
the first channel includes a first back-end opening at the back end of the nozzle body or in the outer surface of the nozzle body; and
the second channel includes a second back-end opening at the back end of the nozzle body or in the outer surface of the nozzle body.

* * * * *

UNITED STATES PATENT AND TRADEMARK OFFICE
CERTIFICATE OF CORRECTION

PATENT NO.        : 11,415,757 B2
APPLICATION NO.   : 15/915455
DATED             : August 16, 2022
INVENTOR(S)       : James Michael Brown et al.

It is certified that error appears in the above-identified patent and that said Letters Patent is hereby corrected as shown below:

In the Claims

In Column 14, Line 23, in Claim 4, after "according" insert -- to --.

In Column 14, Line 45, in Claim 8, delete "HF ≤" and insert -- HF≤ --.

In Column 16, Line 1, in Claim 22, after "according" insert -- to --.

Signed and Sealed this
First Day of November, 2022

*Katherine Kelly Vidal*
Katherine Kelly Vidal
*Director of the United States Patent and Trademark Office*